United States Patent
Davydovich et al.

(10) Patent No.: US 12,421,361 B2
(45) Date of Patent: Sep. 23, 2025

(54) WATER-SOLUBLE FILM INCLUDING METAL SALTS

(71) Applicant: MONOSOL, LLC, Portage, IN (US)

(72) Inventors: Dmitriy Davydovich, Merrillville, IN (US); Ramaswamy Ramaswamy, Merrillville, IN (US); Nicholas Alan Nelson, Hammond, IN (US)

(73) Assignee: MONOSOL, LLC, Portage, IN (US)

( * ) Notice: Subject to any disclaimer, the term of this patent is extended or adjusted under 35 U.S.C. 154(b) by 0 days.

(21) Appl. No.: 18/658,588

(22) Filed: May 8, 2024

(65) Prior Publication Data
US 2024/0376277 A1    Nov. 14, 2024

Related U.S. Application Data

(60) Provisional application No. 63/592,056, filed on Oct. 20, 2023, provisional application No. 63/464,719, filed on May 8, 2023.

(51) Int. Cl.
*C11D 17/04* (2006.01)
*B65D 65/46* (2006.01)
(Continued)

(52) U.S. Cl.
CPC ............... *C08J 5/18* (2013.01); *B65D 65/46* (2013.01); *C08K 13/02* (2013.01); *C11D 17/042* (2013.01); *D01F 1/10* (2013.01); *D01F 6/14* (2013.01); *D04H 1/4309* (2013.01); *B29C 39/003* (2013.01); *B29C 39/026* (2013.01); *B29K 2029/04* (2013.01); *B29K 2105/0038* (2013.01); *B29K 2105/0088* (2013.01); *B29K 2105/0854* (2013.01); *B29K 2995/0012* (2013.01); *B29K 2995/0062* (2013.01);
(Continued)

(58) Field of Classification Search
CPC . C08J 5/18; B65D 65/46; C08K 13/02; C11D 17/042; D01F 1/10; D01F 6/14; B29C 39/003
USPC ....................................... 206/524.7
See application file for complete search history.

(56) References Cited

U.S. PATENT DOCUMENTS 3,681,489 A * 8/1972 Ford ..................... B29D 7/01
 264/307
7,727,946 B2 6/2010 Catalfamo et al.
(Continued)

FOREIGN PATENT DOCUMENTS

CN       105694321 A     6/2016
EP       3712238 A1      9/2020
(Continued)

OTHER PUBLICATIONS

Bhajantri, et al., Microstructural studies on BaCl2 doped poly(vinyl alcohol), Polymer, 47: 3591-3598 (Mar. 2006).
(Continued)

*Primary Examiner* — Jacob K Ackun
(74) *Attorney, Agent, or Firm* — MARSHALL, GERSTEIN & BORUN LLP

(57) ABSTRACT

A water-soluble film comprising a mixture of a polyvinyl alcohol (PVOH) resin, a plasticizer, and a metal salt, wherein the metal salt is present in the water-soluble film in an amount sufficient to reduce the enthalpy of melting of the film by at least 20% compared to the enthalpy of melting of an otherwise identical film not comprising the metal salt.

25 Claims, 3 Drawing Sheets

(51) Int. Cl.

| | |
|---|---|
| *C08J 5/18* | (2006.01) |
| *C08K 13/02* | (2006.01) |
| *D01F 1/10* | (2006.01) |
| *D01F 6/14* | (2006.01) |
| *D04H 1/4309* | (2012.01) |
| *B29C 39/00* | (2006.01) |
| *B29C 39/02* | (2006.01) |
| *B29K 29/00* | (2006.01) |
| *B29K 105/00* | (2006.01) |
| *B29K 105/08* | (2006.01) |
| *B29L 7/00* | (2006.01) |
| *C08K 3/16* | (2006.01) |
| *C08K 3/30* | (2006.01) |
| *C08K 5/053* | (2006.01) |
| *C08K 5/098* | (2006.01) |
| *C08K 5/31* | (2006.01) |

(52) U.S. Cl.
CPC . *B29K 2995/0077* (2013.01); *B29L 2007/008* (2013.01); *C08J 2329/04* (2013.01); *C08K 2003/162* (2013.01); *C08K 2003/166* (2013.01); *C08K 2003/168* (2013.01); *C08K 2003/3063* (2013.01); *C08K 5/053* (2013.01); *C08K 5/098* (2013.01); *C08K 5/31* (2013.01); *C08K 2201/014* (2013.01); *D10B 2505/00* (2013.01)

(56) References Cited

U.S. PATENT DOCUMENTS

| | | | |
|---|---|---|---|
| 8,728,449 B2 | 5/2014 | Verrall et al. | |
| 2005/0266361 A1* | 12/2005 | Funakubo | G03C 5/17 430/619 |
| 2009/0279030 A1* | 11/2009 | Toyama | B32B 27/16 359/489.07 |
| 2014/0371351 A1* | 12/2014 | Dantin | C04B 28/04 524/5 |
| 2016/0251466 A1* | 9/2016 | Kato | C08F 8/12 428/32.39 |
| 2017/0247154 A1 | 8/2017 | Ieda et al. | |
| 2018/0230050 A1* | 8/2018 | Houel | C04B 24/2676 |
| 2021/0370571 A1 | 12/2021 | Morris | |
| 2021/0387444 A1* | 12/2021 | Knight | B32B 27/306 |
| 2022/0002509 A1 | 1/2022 | Kobayashi et al. | |
| 2022/0010162 A1 | 1/2022 | Kobayashi et al. | |
| 2022/0228305 A1 | 7/2022 | Bridewell et al. | |

FOREIGN PATENT DOCUMENTS

| | | |
|---|---|---|
| EP | 3190063 B1 | 8/2021 |
| WO | WO-2006124484 A1 | 11/2006 |
| WO | WO-2022253814 A1 | 12/2022 |

OTHER PUBLICATIONS

Jiang, et al., Studies of the plasticizing effect of different hydrophilic inorganic salts on starch/poly (vinyl alcohol) films, International Journal of Biological Macromolecules, 82: 223-230 (2016).

Jiang, et al., The plasticizing mechanism and effect of calcium chloride on starch/poly(vinyl alcohol) films, Carbohydrate Polymers, 90: 1677-1684 (2012).

Zidan, Structural Properties of CrF3- and MnCl2-Filled Poly(vinyl alcohol) Films, 88: 1115-1120 (Feb. 2003).

Jiang et al., "Melt Processing of Poly(vinyl alcohol) Through Adding Magnesium Chloride Hexahydrate and Ethylene Glycol as a Complex Plasticizer," Polymer Engineering and Science, vol. 52, No. 10 (2012).

International Search Report and Written Opinion issued in International Application No. PCT/US2024/028305 mailed Oct. 15, 2024.

* cited by examiner

WATER-SOLUBLE FILM INCLUDING METAL SALTS

CROSS-REFERENCE TO RELATED APPLICATIONS

The benefit under 35 U.S.C. § 119 (e) of U.S. Provisional Patent Application No. 63/464,719, filed May 8, 2023, and U.S. Provisional Patent Application No. 63/592,056, filed Oct. 20, 2023, is claimed and the entire disclosures thereof are incorporated herein by reference.

FIELD

The present disclosure relates generally to water-soluble films and related articles. More particularly, the disclosure relates to water-soluble films containing one or more metal salts.

BACKGROUND

Water-soluble polymeric films are commonly used as packaging materials to simplify dispersing, pouring, dissolving, and dosing of a material to be delivered. For example, pouches made from water-soluble film are commonly used to package household care compositions such as laundry and dish detergents. A consumer can directly add the pouched composition to a mixing vessel, such as a bucket, sink, or washing machine. Advantageously, this provides for accurate dosing while eliminating the need for the consumer to measure the composition. The pouched composition may also reduce mess that would be associated with dispensing a similar composition from a vessel, such as pouring a composition from a bottle. In sum, soluble pre-measured polymeric film pouches provide for convenience of consumer use in a variety of applications.

Pouches comprising water-soluble films can be produced, for example, by thermoforming. Thermoforming a film is a process of heating the film, shaping the film (for example, in a mold), and allowing the film to cool, whereupon the film will hold its shape, e.g., the shape of the mold. Reducing the temperature at which a water-soluble film can be thermoformed can enable improvements in production cost and throughput, for instance by reducing energy requirements and reducing heating and cooling times. However, such improvements should not be made at the expense of film properties that are relevant to making or using the pouch, such as acceptable mechanical strength, flexibility, and solubility.

Altering the properties of a polymer film by addition of one or more metal salts has been reported. In particular, several authors have noted that addition of metal salts to a polymer film can have a plasticizing effect, as generally evidenced by decreasing glass transition temperature (Tg) of the film with increasing metal salt content. For instance, Jiang et al. (*Carbohydrate Polymers*, 90 (2012) 1677-1684; Intl. Journal of Biological Macromolecules, 82 (2016) 223-230) describe plasticization of starch/polyvinyl alcohol films by addition of various metal chloride salts. Some of the added salts had a detrimental impact on water sorption or thermal stability.

Bhajantri et al. (*Polymer*, 47 (2006) 3591-3598) describe the effects of barium chloride doping on optical, thermal, and structural properties polyvinyl alcohol films. The authors concluded that the dopant acted as a plasticizer but that high dopant concentrations led to phase separation into polymer-rich and dopant-rich phases.

Zidan (*J. Appl. Polym. Sci.*, 88 (2003) 1115-1120) describes thermal properties of chromium fluoride- and manganese chloride-filled PVOH films. In general, increasing filler content reduced Tg and degradation temperature of the films, and the author concluded that the fillers acted to plasticize the films.

There exists a need in the art for a water-soluble film that can be thermoformed at reduced temperature into a package for holding a liquid composition, that has good mechanical properties and solubility, and that maintains good mechanical properties and solubility after thermoforming.

SUMMARY

One aspect of the disclosure provides a water-soluble film comprising a mixture of a polyvinyl alcohol resin, a plasticizer, and a multivalent metal salt comprising an inorganic anion, wherein the multivalent metal salt is present in the water-soluble film in an amount sufficient to reduce the enthalpy of melting of the film by at least 20% compared to the enthalpy of melting of an otherwise identical film not comprising the multivalent metal salt, and wherein the polyvinyl alcohol resin is present in the film in an amount of at least 50 wt. %, based on the total weight of the film.

Another aspect of the disclosure provides a water-soluble film comprising a mixture of a polyvinyl alcohol resin, a plasticizer, and a lithium salt.

Another aspect of the disclosure provides a water-soluble film comprising a mixture of a polyvinyl alcohol resin, a plasticizer, and a salt, wherein the film has a resistance in a dry state of less than about 60 MΩ (megaohms), or less than about 50 MΩ, or less than about 40 MΩ, or less than about 30 MΩ. The salt can be selected from the group consisting of guanidinium chloride, potassium chloride, ammonium chloride, and potassium iodide.

Another aspect of the disclosure provides a water-soluble article formed by thermoforming the water-soluble film according to the disclosure.

Another aspect of the disclosure provides a method of forming a water-soluble article comprising thermoforming a water-soluble film according to the disclosure.

Another aspect of the disclosure provides a water-soluble fiber comprising a mixture of a polyvinyl alcohol resin, a plasticizer, and a multivalent metal salt.

For the compositions and methods described herein, optional features, including but not limited to components, compositional ranges thereof, substituents, conditions, and steps are contemplated to be selected from the various aspects, embodiments, and examples provided herein.

Further aspects and advantages will be apparent to those of ordinary skill in the art from a review of the following detailed description, taken in conjunction with the drawings. While the film, article, pouch, and their methods of making and use are susceptible of embodiments in various forms, the description hereafter includes specific embodiments with the understanding that the disclosure is illustrative, and is not intended to limit the invention to the specific embodiments described herein.

BRIEF DESCRIPTION OF THE DRAWINGS

For further facilitating the understanding of the present invention, 3 drawing figures are appended hereto.

FIG. 1 shows a DSC trace of a water-soluble film of the disclosure as described in Example 1a.

DETAILED DESCRIPTION

Figure 1:
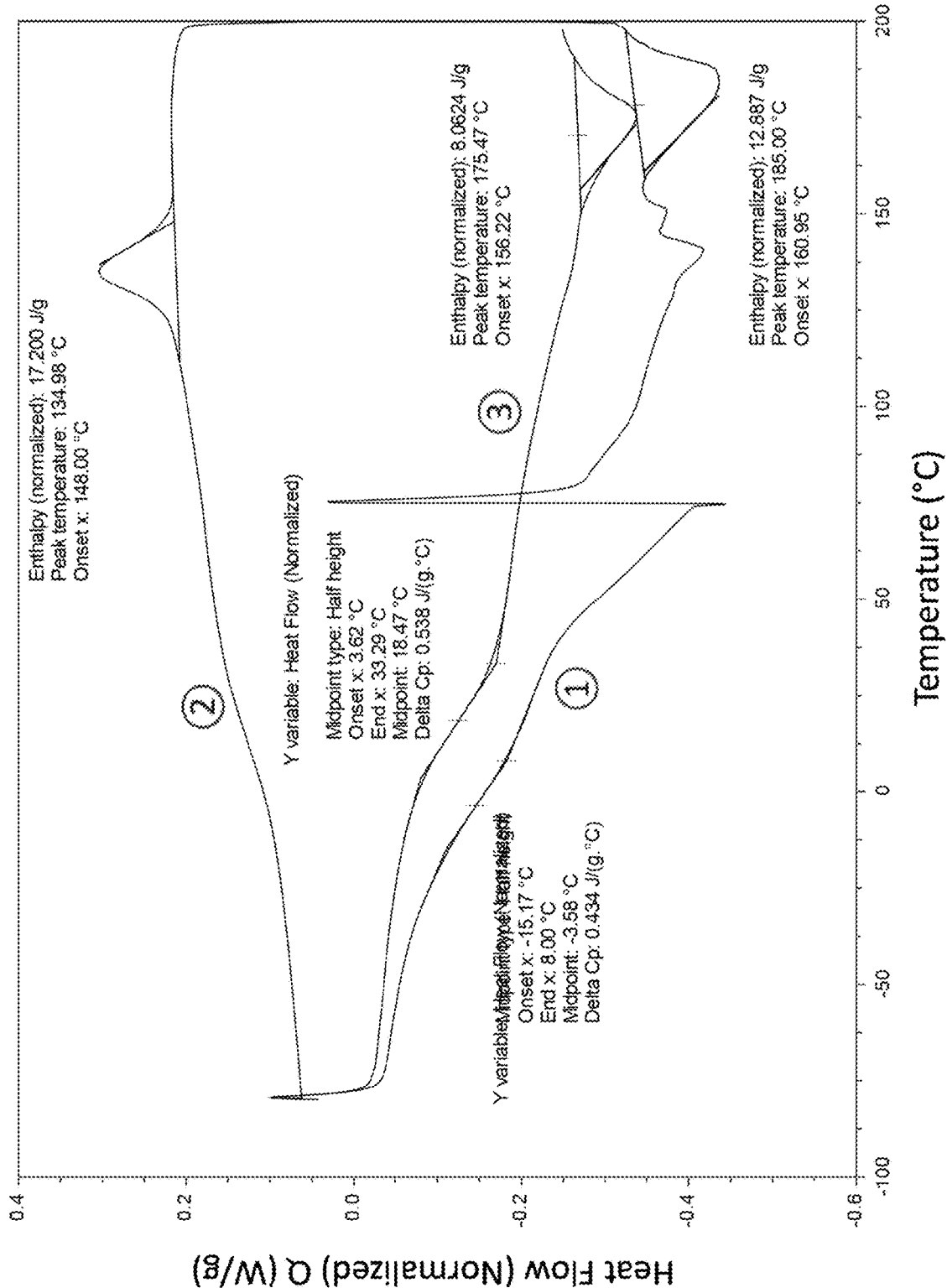

The disclosure provides a water-soluble film comprising a mixture of a polyvinyl alcohol (PVOH) resin, a plasticizer, and a multivalent metal salt comprising an inorganic anion, wherein the multivalent metal salt is present in the water-soluble film in an amount sufficient to reduce the enthalpy of melting of the film by at least 20% compared to the enthalpy of melting of an otherwise identical film not comprising the multivalent metal salt, and wherein the PVOH resin is present in the film in an amount of at least 50 wt. %, based on the total weight of the film.

The disclosure also provides water-soluble films comprising a mixture of a polyvinyl alcohol (PVOH) resin, a plasticizer, and a lithium salt.

The films of the disclosure surprisingly provide one or more benefits, including but not limited to improved thermoformability at temperatures below typical thermoforming temperatures, reduced enthalpy of melting, and/or reduced enthalpy of crystallization compared to that of an otherwise identical film not containing a metal salt.

"Comprising" as used herein means that various components, ingredients, or steps that can be conjointly employed in practicing the present disclosure. Accordingly, the term "comprising" encompasses the more restrictive terms "consisting essentially of" and "consisting of." The present compositions can comprise, consist essentially of, or consist of any of the required and optional elements disclosed herein. The invention illustratively disclosed herein suitably may be practiced in the absence of any element or step which is not specifically disclosed herein.

Films, such as those made in accordance with the disclosure, are defined by the polymer industry (Encyclopedia of Polymer Science and Technology, John Wiley & Sons, Inc., 1967, Vol. 6, page 764) as "shaped plastics that are comparatively thin in relation to their breadth and width and have a maximum thickness of 0.010 in."

The films of the disclosure can be self-supporting films and/or uniform films. Self-supporting films are those capable of supporting their own weight. Uniform films refer to those which are virtually free of breaks, tears, holes, bubbles, and striations.

To be considered a water-soluble film according to the present disclosure, the film, at a thickness of about 1.5 mil (about 0.038 mm), dissolves in 300 seconds or less in water at a temperature of 20° C. (68° F.) in accordance with MonoSol Test Method MSTM 205. A film according to the present disclosure can be considered water-soluble if the film, at a thickness of about 1.5 mil (about 0.038 mm), dissolves in 250 seconds or less, 200 seconds or less, or 150 seconds or less, in water at a temperature of 20° C. (68° F.) in accordance with MonoSol Test Method MSTM 205.

All percentages, parts and ratios are based upon the total dry weight of the formed film composition and all measurements are made at about 25° C., unless otherwise specified. All such weights as they pertain to listed ingredients are based on the active level and therefore do not include carriers or by-products that may be included in commercially available materials, unless otherwise specified.

All ranges set forth herein include all possible subsets of ranges and any combinations of such subset ranges. By default, ranges are inclusive of the stated endpoints, unless stated otherwise. Where a range of values is provided, it is understood that each intervening value between the upper and lower limit of that range and any other stated or intervening value in that stated range, is encompassed within the disclosure. The upper and lower limits of these smaller ranges may independently be included in the smaller ranges, and are also encompassed within the disclosure, subject to any specifically excluded limit in the stated range. Where the stated range includes one or both of the limits, ranges excluding either or both of those included limits are also contemplated to be part of the disclosure.

The dimensions and values disclosed herein are not to be understood as being strictly limited to the exact numerical values recited. Instead, unless otherwise specified, each such dimension is intended to include both the recited value and a functionally equivalent range surrounding that value. For example, a dimension disclosed as "15 mm" is intended to include "about 15 mm". The term "about" is used according to its ordinary meaning, for example, to mean approximately or around. The term "about" can mean ±10% of a stated value or range of values. The term "about" can mean ±5% of a stated value or range of values. The term "about" can mean ±2% of a stated value or range of values.

As used herein and unless specified otherwise, the terms "wt. %" and "wt %" are intended to refer to the composition of the identified elements in "dry" (non water) parts by weight of the entire film (when applicable) or parts by weight of the entire composition enclosed within a pouch (when applicable). As used herein and unless specified otherwise, the term "PHR" is intended to refer to the composition of the identified element in parts per one hundred parts water-soluble polymer (or resin; whether polyvinyl alcohol or otherwise) in the water-soluble film.

The film can be made by a solution casting method, or by a melt extrusion method. The film can be used to form an article or a pouch by any suitable process, including thermoforming and, for example, solvent sealing or heat sealing of film layers around a periphery of the article. The pouches can be used for dosing materials to be delivered into bulk water, for example.

The films, articles, and related methods of making and use are contemplated to include embodiments including any combination of one or more of the elements, features, and steps further described below (including those shown in the Examples and figures), unless stated otherwise.

Water-Soluble Films

The film and related articles and pouches described herein can comprise a water-soluble film containing a metal salt, wherein the metal salt is distributed throughout the film. The water-soluble film can be solution cast. The films optionally further include one or more additives selected from plasticizers, fillers, surfactants, anti-block agents, antioxidants, antifoams, bleaching agents, aversive agents, pungents, other functional ingredients, and combinations of the foregoing. In one aspect, the water-soluble film can comprise a total of at least about 50 wt %, based on the total dry weight (i.e., weight of non-water components) of the film, of a PVOH resin comprising one or more PVOH polymers.

The film can have any suitable thickness, and film thicknesses of about 76 microns (μm) or 88 microns are typical and particularly contemplated. Other values and ranges contemplated include values in a range of about 5 to about 200 μm, or in a range of about 20 to about 100 μm, or about 60 to about 120 μm, or about 70 to about 100 μm, or about 40 to about 90 μm, or about 50 to about 80 μm, or about 60 to about 65 μm, or about 20 to about 60 μm, or about 20 to about 50 μm, or about 30 to about 40 μm, for example about 35 μm, about 36 μm, about 50 μm, about 65 μm, about 76 μm, about 88 μm, or about 90 μm.

PVOH Resins

The film described herein can include one or more polyvinyl alcohol (PVOH) polymers to make up the PVOH resin content of the film, and can include a PVOH copolymer resin.

Polyvinyl alcohol is a synthetic resin generally prepared by the alcoholysis, usually termed hydrolysis or saponification, of polyvinyl acetate. Fully hydrolyzed PVOH, where virtually all the acetate groups have been converted to alcohol groups, is a strongly hydrogen-bonded, highly crystalline polymer which dissolves only in hot water-greater than about 140° F. (about 60° C.). If a sufficient number of acetate groups are allowed to remain after the hydrolysis of polyvinyl acetate, that is, the PVOH polymer is partially hydrolyzed, then the polymer is more weakly hydrogen-bonded, less crystalline, and is generally soluble in cold water-less than about 50° F. (about 10° C.). As such, the partially hydrolyzed polymer is a vinyl alcohol-vinyl acetate copolymer that is a PVOH copolymer, but is commonly referred to as PVOH homopolymer.

The PVOH resin can comprise a fully or partially hydrolyzed homopolymer that includes a vinyl alcohol monomer unit and optionally a vinyl acetate monomer unit. The PVOH resin can include a partially or fully hydrolyzed PVOH copolymer that includes an anionic monomer unit (i.e., an anionic-modified copolymer), a vinyl alcohol monomer unit, and optionally a vinyl acetate monomer unit. The anionic monomer unit can be one or more of vinyl acetic acid, alkyl acrylates, maleic acid, monoalkyl maleate, dialkyl maleate, monomethyl maleate, dimethyl maleate, maleic anhydride, fumaric acid, monoalkyl fumarate, dialkyl fumarate, monomethyl fumarate, dimethyl fumarate, itaconic acid, monomethyl itaconate, dimethyl itaconate, itaconic anhydride, citraconic acid, monoalkyl citraconate, dialkyl citraconate, citraconic anhydride, mesaconic acid, monoalkyl mesaconate, dialkyl mesaconate, glutaconic acid, monoalkyl glutaconate, dialkyl glutaconate, glutaconic anhydride, vinyl sulfonic acid, alkyl sulfonic acid, ethylene sulfonic acid, 2-acrylamido-1-methyl propane sulfonic acid, 2-acrylamide-2-methylpropanesulfonic acid, 2-methylacrylamido-2-methylpropanesulfonic acid, 2-sulfoethyl acrylate, alkali metal salts of the foregoing (e.g., sodium, potassium, or other alkali metal salts), esters of the foregoing (e.g., methyl, ethyl, or other C1-C4 or C6 alkyl esters), and combinations of the foregoing (e.g., multiple types of anionic monomers or equivalent forms of the same anionic monomer). For example, the anionic monomer can include one or more of monomethyl maleate and alkali metal salts thereof (e.g., sodium salts).

The water-soluble film can comprise a single PVOH resin or a blend of two or more PVOH resins. For example, the film can comprise a PVOH homopolymer, a PVOH copolymer, a blend of a PVOH homopolymer and a PVOH copolymer, a blend of two PVOH homopolymers, a blend of two PVOH copolymers, or a combination thereof. The water-soluble film of the disclosure can include a polyvinyl alcohol homopolymer and can be free of an anionic-modified polyvinyl alcohol. The total amount of PVOH resin in the film can be in a range of about 50% to about 95% by weight based on the total dry weight (i.e., weight of non-water components) of the film, or about 60% to about 90%, or about 65% to about 85%, for example.

The total PVOH resin content of the film can have a degree of hydrolysis (D.H. or DH) of at least about 68%, 75%, 80%, 84%, or 85% and at most about 99.7%, 98%, or 96%, for example in a range of about 75% to about 96%, or about 84% to about 90%, or about 85% to about 88%, or about 86.5%, or in a range of about 88% to 95%, about 89% to 93%, or about 89.5% to 92%, for example, about 89%, about 90%, about 92%, about 93%, about 94%, about 95%, or about 96%. As used herein, the degree of hydrolysis is expressed as a mole percentage of vinyl acetate units converted to vinyl alcohol units.

The degree of hydrolysis of a resin blend can also be characterized by the arithmetic weighted, average degree of hydrolysis ($\overline{H}°$). For example, $\overline{H}°$ for a PVOH resin that comprises two or more PVOH polymers is calculated by the formula $\overline{H}°=\Sigma(W_i \cdot H_i)$ where $W_i$ is the weight percentage of the respective PVOH polymer and $H_i$ is the respective degrees of hydrolysis.

The viscosity of a PVOH polymer (u) is determined by measuring a freshly made solution using a Brookfield LV type viscometer with UL adapter as described in British Standard ENISO 15023-2:2006 Annex E Brookfield Test method. It is international practice to state the viscosity of 4% (w/v) aqueous polyvinyl alcohol solutions at 20° C. All viscosities specified herein in centipoise (cP) should be understood to refer to the viscosity of 4% (w/v) aqueous polyvinyl alcohol solution at 20° C., unless specified otherwise. Similarly, when a resin is described as having (or not having) a particular viscosity, unless specified otherwise, it is intended that the specified viscosity is the average viscosity for the resin, which inherently has a corresponding molecular weight distribution.

Suitable PVOH resins, for use individually or in combinations, can have viscosities in a range of about 3 cP to about 40 cP, or about 5 cP to about 38 cP, or about 10 cP to about 36 cP, or about 10 cP to about 20 cP, or about 12 cP to about 20 cP, or about 14 cP to about 19 cP, or about 3 cP to about 30 cP, or about 5 cP to about 25 cP, or about 5 cP to about 15 cP, or about 5 cP to about 10 cP, or about 5 cP to about 7 cP, or about 12 cP to about 34 cP, or about 14 cP to about 32 cP, or about 18 cP to about 30 cP, about 20 cP to about 28 cP, about 21 cP to about 26 cP, for example, 32 cP, or 26 cP, or 23.5 cP, or 21 cP, or 19 cP, or 16.5 cP, or 14 cP, or 6 cP. It is well known in the art that the viscosity of PVOH resins is correlated with the weight average molecular weight ($\overline{M}w$) of the PVOH resin, and often the viscosity is used as a proxy for the $\overline{M}w$. When referring to the viscosity of a PVOH resin comprising a PVOH polymer blend, the weighted natural log average viscosity ($\bar{\mu}$) is used. The $\bar{\mu}$ for a PVOH resin that comprises two or more PVOH polymers is calculated by the formula $\bar{\mu}=e\Sigma W_i \cdot \ln \mu_i$ where $\mu_i$ is the viscosity for the respective PVOH polymers.

Other water-soluble polymers for use in addition to the PVOH copolymer in the film can include, but are not limited to polyacrylates, water-soluble acrylate copolymers, polyvinyl pyrrolidone, polyethyleneimine, pullulan, water-soluble natural polymers including, but not limited to, guar gum, gum Acacia, xanthan gum, carrageenan, pectin, amylopectin, alginic acid and salts thereof, and starch, water-soluble polymer derivatives including, but not limited to, modified starches, ethoxylated starch, and hydroxypropylated starch, copolymers of the forgoing and combinations of any of the foregoing. Yet other water-soluble polymers can include polyalkylene oxides, polyacrylamides, polyacrylic acids and salts thereof, celluloses, cellulose ethers, cellulose esters, cellulose amides, polyvinyl acetates, polycarboxylic acids and salts thereof, polyaminoacids, polyamides, gelatines, methylcelluloses, carboxymethylcelluloses and salts thereof, dextrins, ethylcelluloses, hydroxyethyl celluloses, hydroxypropyl methylcelluloses, maltodextrins, polymethacrylates, and combinations of any of the foregoing. The film can include a polyethyleneimine, a polyvinyl pyrrolidone, a polyalkylene oxide, a polyacrylamide, a cellulose ether, a cellulose ester, a cellulose amide, a polyvinyl acetate, a polyamide, a gelatin, a methylcellulose, a carboxymethylcellulose, a carboxymethyl cellulose salt, a dextrin, an ethylcellulose, a hydroxyethyl cellulose, a hydroxypropyl methylcellulose, a maltodextrin, a starch, a modified starch, guar gum, gum Acacia, xanthan gum, carrageenan, a polyacrylate, a polyacrylate salt, and a copolymer of any of the foregoing. Such water-soluble polymers, whether PVOH or otherwise, are commercially available from a variety of sources.

Metal Salts

In general, the water-soluble films of the disclosure include a metal salt. The metal salt can comprise a cation selected from the group of lithium, sodium, potassium, calcium, magnesium, manganese, barium, iron, aluminum, and mixtures thereof. The metal salt can comprise a cation having an ionic radius of 115 pm or less. Without intending to be bound by theory, it is believed that the cation of the metal salt can partially cross-link the PVOH comprising the water-soluble film, for instance via ionic crosslinking, disrupting polymer chain alignment and inhibiting or preventing crystallization. It is also believed that as the ionic radius of the cation increases, the charge density of the cation decreases, reducing the strength of the cross-linking between the cation and the PVOH and diminishing the effect of inhibiting or preventing crystallization. The metal salt can comprise a multivalent cation. The multivalent salt can comprise a divalent metal cation. The multivalent metal salt can comprise a trivalent metal cation. The multivalent salt can be selected from calcium salts, magnesium salts, manganese salts, barium salts, iron salts, and mixtures thereof. The multivalent salt can be selected from calcium salts, magnesium salts, manganese salts, and mixtures thereof. The multivalent salt can comprise a calcium salt. The multivalent salt can comprise a magnesium salt. The multivalent salt can comprise a manganese salt.

In aspects, the multivalent metal salt does not comprise a zinc salt. The water-soluble film can be free of zinc salts. As used herein, and unless specified otherwise, "free of zinc salts" refers to a film having less than 0.5% zinc, based on the total weight of the film. Without intending to be bound by theory, it is believed that addition of a zinc salt to a polyvinyl alcohol-based film generally has a lesser effect on thermal properties of the film compared to addition of other multivalent metal salts, including, but not limited to, calcium, magnesium, and manganese salts.

In general, the multivalent metal salt can comprise an inorganic anion. The inorganic anion can be selected from a halide, a nitrate, a sulfate, a phosphate, and a combination thereof. The inorganic anion can be a halide. The halide can be selected from chloride, fluoride, bromide, iodide, or a combination thereof. The inorganic anion can be selected from chloride and fluoride. The metal salt can comprise calcium chloride.

As shown below in the examples, the metal salts do not have a direct plasticizing effect on the films. However, without intending to be bound by theory, when a film of the disclosure is exposed to moisture, such as high humidity conditions, the presence of a salt having an inorganic anion can increase the film's capacity to take on water, effectively plasticizing the film.

The water-soluble film can comprise a multivalent salt comprising an inorganic anion and a multivalent metal salt comprising an organic anion. Suitable organic anions include, but are not limited to, acetate, citrate, gluconate, lactate, and mixtures thereof. Without intending to be bound by theory, it is believed that salts comprising organic anions are generally less effective at retaining water compared to salts comprising inorganic anions and, accordingly, provide less plasticization to the film through water uptake; however, it is further believed that the multivalent metal salt comprising an organic anion can be an additional source of multivalent cation, thus contributing to the reduction of crystallinity imparted by the multivalent metal salt comprising the inorganic anion.

In general, the amount of multivalent metal salt in the film can be any amount sufficient to improve one or more film properties compared to an otherwise identical film not comprising the multivalent metal salt. Such film properties can include, but are not limited to, enthalpy of melting, enthalpy of crystallization, glass transition temperature, Young's modulus, disintegration time, and dissolution time. Thus, the multivalent metal salt can be provided in an amount sufficient to reduce the enthalpy of melting of the film by at least 20%, compared to the enthalpy of melting of an otherwise identical film not including the multivalent metal salt. The multivalent metal salt can be provided in an amount sufficient to reduce the enthalpy of melting of the film by at least about 20%, at least about 25%, at least about 30%, at least about 40%, at least about 50%, at least about 60%, at least about 70%, or at least about 75%, or by up to about 80%, or up to about 90%, or up to about 100%, compared to the enthalpy of melting of an otherwise identical film not including the multivalent metal salt. Without intending to be bound by theory, it is believed that as the enthalpy of melting of a given film decreases, the temperature at which the film can be thermoformed decreases. The films of the disclosure can have an enthalpy of melting of less than about 20 J/g, or less than about 15 J/g, or less than about 10 J/g, or less than about 5 J/g, or less than about 1 J/g, or less than about 0.2 J/g. Alternatively, films of the disclosure can exhibit no melting transition as measured by DSC and not have an enthalpy of melting.

The multivalent metal salt can be provided in an amount sufficient to reduce the enthalpy of crystallization of the film by at least 20%, compared to the crystallization temperature of an otherwise identical film not including the multivalent metal salt. For instance, the multivalent metal salt can be provided in an amount sufficient to reduce the enthalpy of crystallization of the film by at least about 20%, at least about 25%, at least about 30%, at least about 40%, at least about 50%, at least about 60%, at least about 70%, or at least about 75%, or by up to about 80%, or up to about 90%, or up to about 100%, compared to the enthalpy of crystallization of an otherwise identical film not comprising the metal salt. Without intending to be bound by theory, it is believed that as the enthalpy of crystallization decreases, the film can be thermoformed at a lower temperature. The films of the disclosure can have an enthalpy of crystallization of less than about 50 J/g, or less than about 30 J/g, or less than about 15 J/g, or less than about 10 J/g, or less than about 5 J/g, or less than about 1 J/g, or less than about 0.2 J/g. Alternatively, films of the disclosure can exhibit no crystallization transition as measured by DSC and not have an enthalpy of crystallization.

In general, a glass transition temperature is a temperature at which a material transitions between a glassy state and a rubbery state. The films of the disclosure can exhibit a first glass transition temperature (Tg, or simply the glass transition temperature) and a second glass transition temperature ($Tg_2$, or a dry glass transition temperature). Measuring Tg of a film according to the DSC Method described herein includes first cooling a sample of the film to −80° C., then heating the film sample to 200° C., during which the glass transition is assigned. Films of the disclosure can contain water, and the presence of a metal salt in the film can increase the film's capacity to uptake water. The cooling step of the DSC Method does not drive off water comprising the film sample; as such, water is present in the film sample during the Tg measurement, and Tg is a glass transition temperature of the film in a hydrated state (i.e., still containing water). However, heating the film sample to 200° C. as part of the Tg measurement drives off substantially all water comprising the film sample. Thus, repeating the cooling-heating process on a film sample on which Tg has already been measured, as described in the DSC Method, provides a glass transition temperature of the dry (i.e., substantially water-free) film composition. This second glass transition temperature, measured on a substantially water-free film sample, is denoted herein as $Tg_2$.

The multivalent metal salt can be provided in an amount sufficient to increase the glass transition temperature (i.e., the first glass transition temperature, or Tg) of the film by at least 10° C., compared to the glass transition temperature of an otherwise identical film not including the multivalent metal salt. For instance, the films of the disclosure can have a glass transition temperature that is at least about 10° C. greater than, or at least about 15° C. greater than, or at least about 20° C. greater than, the glass transition temperature of an otherwise identical film not comprising the multivalent metal salt. Without intending to be bound by theory, it is believed that increasing the multivalent metal salt content of the film can increase cross-linking of PVOH chains, increasing the energy (i.e., temperature) required to bring the film to an amorphous state.

The multivalent metal salt can be provided in an amount sufficient to increase the second glass transition temperature (i.e., "dry" glass transition temperature, or $Tg_2$) of the film by at least 10° C., compared to the second glass transition temperature of an otherwise identical film not including the multivalent metal salt. For instance, the films of the disclosure can have a second glass transition temperature that is at least about 10° C. greater than, or at least about 20° C., or about 30° C., or about 40° C., or about 50° C., or about 60° C., or about 70° C., greater than the second glass transition temperature of an otherwise identical film not comprising the multivalent metal salt.

As used herein, and unless described otherwise, "glass transition temperature," "a glass transition temperature," and "the glass transition temperature" refer to the first glass transition temperature, Tg, i.e., the glass transition temperature of the film in a hydrated state.

The multivalent metal salt can be provided in an amount sufficient to increase the Young's modulus of the film by at least about 10%, or at least about 20%, or at least about 30%, or at least about 50%, or at least about 70%, or at least about 90%, compared to the Young's modulus of an otherwise identical film not including the multivalent metal salt. Without intending to be bound by theory, it is believed that increasing the multivalent metal salt content of the film can increase cross-linking of PVOH chains, reducing polymer mobility and providing a stiffer (i.e., higher Young's modulus) film. The films of the disclosure can have a Young's modulus in a range of from about 40 to about 1000 N/mm$^2$, or about 50 to about 500 N/mm$^2$, or about 60 to about 300 N/mm$^2$, or about 100 to about 200 N/mm$^2$.

The multivalent metal salt can be provided in an amount sufficient to decrease the disintegration time of the film by at least about 5%, or at least about 10%, or at least about 20%, or at least about 30%, or at least about 40%, or at least about 50%. Without intending to be bound by theory, it is believed that incorporating a metal salt comprising an inorganic anion into a water-soluble film increases the film's capacity to retain water and makes the film more readily disintegrable in water.

The multivalent metal salt can be provided in an amount sufficient to decrease the dissolution time of the film by at least about 5%, or at least about 10%, or at least about 20%, or at least about 30%, or at least about 40%, or at least about 50%. Without intending to be bound by theory, it is believed that incorporating a metal salt comprising an inorganic anion into a water-soluble film increases the film's capacity to retain water and can make the film more readily soluble in water.

The multivalent metal salt can be provided in the water-soluble film in an amount in a range of about 1 PHR to about 30 PHR, or about 2 PHR to about 25 PHR, or about 3 PHR to about 20 PHR, or about 5 PHR to about 15 PHR, or about 6 PHR to about 12 PHR, for example, less than about 30 PHR, less than about 20 PHR, or less than about 15 PHR. Without intending to be bound by theory, it is believed that as the amount of multivalent metal salt in the film decreases, for instance below 1 PHR, the degree to which the multivalent metal salt affects crystallinity decreases accordingly, reducing the benefit to thermal properties of the film. Further, without intending to be bound by theory, it is believed that as the amount of multivalent metal salt in the film increases, for instance above 30 PHR, while thermal properties can continue to improve, physical strength of the film can be affected due in part to lower polymer content of the film. It is also believed that as the amount of multivalent metal salt in the film increases, components of the film can begin to separate out of the bulk film and accumulate on the film surface. For example, as multivalent metal salt content of the film increases, one or more plasticizers (including but not limited to polyol or sugar alcohol plasticizers, as described herein) can begin to "bleed" from the bulk of the film onto the surface of the film. Buildup of plasticizer on the film surface can result in a film having an undesirably sticky surface. Such stickiness can be compensated for, for instance, by addition of an antiblocking agent to the film, for instance, providing the antiblocking agent as part of the film itself and/or applying an antiblocking agent directly to the surface of the film, allowing an increase in multivalent metal salt content, so as to provide an improvement in thermal properties without suffering from negative effects of bleeding of plasticizer from the bulk of the film.

The water-soluble film can comprise a multivalent salt and a monovalent metal salt. The monovalent metal salt can comprise a monovalent cation selected from the group of lithium, sodium, potassium, and a combination thereof. The monovalent cation can be lithium. The monovalent metal salt can comprise any inorganic or organic anions disclosed herein.

The metal salt can be a lithium salt comprising an inorganic anion. In general, the amount of lithium salt in the film can be any amount sufficient to improve one or more film properties compared to an otherwise identical film not comprising the lithium salt. Such film properties can include, but are not limited to, enthalpy of melting, enthalpy of crystallization, glass transition temperature, disintegration time, and dissolution time. The lithium salt can be present in the film in an amount sufficient to reduce the enthalpy of melting of the film by at least about 20% compared to the enthalpy of melting of an otherwise identical film not comprising the lithium salt. For instance, the lithium salt can be provided in an amount sufficient to reduce the enthalpy of melting of the film by at least about 20%, at least about 25%, at least about 30%, at least about 40%, at least about 50%, at least about 60%, at least about 70%, or at least about 75%, compared to the enthalpy of melting of an otherwise identical film not including the lithium salt.

The lithium salt can be present in the film in an amount sufficient to reduce the enthalpy of crystallization of the film by at least about 20% compared to the enthalpy of crystallization of an otherwise identical film not comprising the lithium salt. For instance, the lithium salt can be provided in an amount sufficient to reduce the enthalpy of crystallization of the film by at least about 20%, at least about 25%, at least about 30%, at least about 40%, at least about 50%, at least about 60%, at least about 70%, or at least about 75%, compared to the enthalpy of crystallization of an otherwise identical film not including the lithium salt.

The lithium salt can be provided in an amount sufficient to increase the glass transition temperature of the film by at least about 5° C., compared to the glass transition temperature of an otherwise identical film not including the lithium salt. For instance, a film of the disclosure comprising a lithium salt can have a glass transition temperature that is at least about 5° C. greater than, or at least about 10° C. greater than, or at least about 15° C. greater than, or at least about 20° C. greater than, the glass transition temperature of an otherwise identical film not comprising the lithium salt.

The lithium salt can be provided in an amount sufficient to decrease the disintegration time of the film by at least about 5%, or at least about 10%, or at least about 20%, or at least about 30%, or at least about 40%, or at least about 50%, compared to the disintegration time of an otherwise identical film not comprising the lithium salt.

The lithium salt can be provided in an amount sufficient to decrease the dissolution time of the film by at least about 5%, or at least about 10%, or at least about 20%, or at least about 30%, or at least about 40%, or at least about 50%, compared to the dissolution time of an otherwise identical film not comprising the lithium salt.

The lithium salt can be present in the film in an amount in a range from about 1 PHR to about 30 PHR, or about 2 PHR to about 25 PHR, or about 3 PHR to about 20 PHR, or about 5 PHR to about 15 PHR, or about 6 PHR to about 12 PHR, or about 2 PHR to about 10 PHR, for example, less than about 30 PHR, less than about 20 PHR, or less than about 15 PHR. Without intending to be bound by theory, it is believed that as the amount of lithium salt in the film decreases, the benefit of the lithium salt to thermal properties of the film decreases. Further, without intending to be bound by theory, it is believed that as the amount of lithium salt in the film increases, thermal properties can continue to improve, but physical strength of the film can be affected due in part to reduced polymer content of the film.

Secondary Ingredients

The water-soluble film including the resin disclosed herein can contain other auxiliary agents and processing agents, such as, but not limited to, plasticizers, plasticizer compatibilizers, surfactants, lubricants, release agents, fillers, extenders, cross-linking agents, antiblocking agents, antioxidants, detackifying agents, antifoams, nanoparticles such as layered silicate-type nanoclays (e.g., sodium montmorillonite), bleaching agents (e.g., sodium metabisulfite, sodium bisulfite or others), aversive agents such as bitterants (e.g., denatonium salts such as denatonium benzoate, denatonium saccharide, and denatonium chloride; sucrose octaacetate; quinine; flavonoids such as quercetin and naringen; and quassinoids such as quassin and brucine) and pungents (e.g., capsaicin, piperine, allyl isothiocyanate, and resiniferatoxin), and other functional ingredients, in amounts suitable for their intended purposes. Films including plasticizers are particularly contemplated. The water-soluble film can include a surfactant, an antioxidant, a bittering agent, a soil release polymer, an anti-redeposition aid, a chelant, a builder, a perfume, or combinations thereof. The amount of auxiliary agents can be, for example, up to about 50 wt. %, 20 wt. %, 15 wt. %, 10 wt. %, 5 wt. %, 4 wt. % and/or at least 0.01 wt. %, 0.1 wt. %, 1 wt. %, or 5 wt. %, individually or collectively.

Plasticizers

A plasticizer is a liquid, solid, or semi-solid that is added to a material (usually a resin or elastomer) making that material softer, more flexible (by decreasing the glass transition temperature of the polymer), and easier to process. At low plasticizer levels, films may become brittle, difficult to process, or prone to breaking. At elevated plasticizer levels, films may be too soft, weak, or difficult to process for a desired use. Water is recognized as a very efficient plasticizer for PVOH and other polymers; including but not limited to water-soluble polymers, however, the volatility of water limits its utility, as polymer films need to have at least some resistance (robustness) to a variety of ambient conditions including low and high relative humidity. Accordingly, as used herein, the term "plasticizer" does not encompass water.

In general, for a water-soluble film of the disclosure that includes a multivalent metal salt, the water-soluble film can further include a plasticizer. The plasticizer can include, but is not limited to, a polyol, a sugar alcohol, a polyether, an amine, or a mixture thereof. For instance, the plasticizer can comprise a plasticizer selected from the group of a polyol, a sugar alcohol, a polyether, an amine, or a combination thereof. The plasticizer can include, but is not limited to, glycerol, diglycerin, ethylene glycol, diethylene glycol, triethyleneglycol, tetraethylene glycol, polyethylene glycols up to 400 MW, neopentyl glycol, 1,2-propylene glycol, 1,3-propanediol, dipropylene glycol, polypropylene glycol, 2-methyl-1,3-propanediol, trimethylolpropane, polyether polyols, isomalt, maltitol, sorbitol, xylitol, erythritol, adonitol, dulcitol, pentaerythritol, mannitol, ethanolamines, and mixtures thereof. The plasticizer does not include a divalent metal.

The total amount of the non-water plasticizer can be in a range of about 10 to about 50 weight parts per one hundred parts PVOH resin (PHR), or about 10 to about 45 PHR, or about 15 to about 45 PHR, or about 15 to 40 PHR, or about 17 to 40 PHR, or about 20 to about 40 PHR, or about 25 to about 40 PHR, or about 25 to about 35 PHR, or about 25 PHR to about 30 PHR.

Surfactants

Surfactants for use in water-soluble films are well known in the art. Optionally, surfactants are included to aid in the dispersion of the resin solution upon casting to form a film. Suitable surfactants can include the nonionic, cationic, anionic and zwitterionic classes. Suitable surfactants include, but are not limited to, propylene glycols, diethylene glycols, monoethanolamine, polyoxyethylenated polyoxypropylene glycols, alcohol ethoxylates, alkylphenol ethoxylates, tertiary acetylenic glycols and alkanolamides (nonionics), polyoxyethylenated amines, quaternary ammonium salts and quaternized polyoxyethylenated amines (cationics), alkali metal salts of higher fatty acids containing about 8 to 24 carbon atoms, alkyl sulfates, alkyl polyethoxylate sulfates and alkylbenzene sulfonates (anionics), and amine oxides, N-alkylbetaines and sulfobetaines (zwitterionics). Other suitable surfactants include dialkyl sulfosuccinates, lactylated fatty acid esters of glycerin and propylene glycol, lactylic esters of fatty acids, sodium alkyl sulfates, polysorbate 20, polysorbate 60, polysorbate 65, polysorbate 80, alkyl polyethylene glycol, lecithin, acetylated fatty acid esters of glycerin and propylene glycol, sodium lauryl sulfate, acetylated esters of fatty acids, myristyl dimethylamine oxide, trimethyl tallow alkyl ammonium chloride, quaternary ammonium compounds, salts thereof and combinations of any of the foregoing. The surfactant can comprise a surfactant selected from the group consisting of polyoxyethylenated polyoxypropylene glycols, alcohol ethoxylates, alkylphenol ethoxylates, tertiary acetylenic glycols and alkanolamides, polyoxyethylenated amines, quaternary ammonium salts and quaternized polyoxyethylenated amines, and amine oxides, N-alkylbetaines, sulfobetaines, and combinations thereof.

The amount of surfactant in the water-soluble film can be in a range of about 0.1 wt. % to about 8.0 wt. %, or about 1.0 wt % to about 7.0 wt. %, or about 3 wt. % to about 7 wt. %, or about 5 wt. % to about 7 wt. %, or about 0.1 wt. % to 2.5 wt. %. Too little surfactant can sometimes result in a cast film having holes, whereas too much surfactant can result in the film having a greasy or oily feel from excess surfactant present on the surface of the film.

Lubricants/Release Agents

Suitable lubricants/release agents for use in the water-soluble films described herein can include, but are not limited to, fatty acids and their salts, fatty alcohols, fatty esters, fatty amines, fatty amine acetates and fatty amides. Preferred lubricants/release agents are fatty acids, fatty acid salts, and fatty amine acetates. The amount of lubricant/release agent in the water-soluble film can be in a range of about 0.02 wt. % to about 1.5 wt. %, optionally about 0.1 wt. % to about 1 wt. %.

Defoamer

The water-soluble films disclosed herein can also include a defoamer. Defoamers can aid in coalescing of foam bubbles. Suitable defoamers for use in water-soluble films according to the present disclosure include, but are not limited to, hydrophobic silicas, for example silicon dioxide, siloxane, silicone ethers, or fumed silica in fine particle sizes, and proprietary, non-mineral oil defoamers including Foam Blast® defoamers available from Emerald Performance Materials, including Foam Blast® 327, Foam Blast® UVD, Foam Blast® 163, Foam Blast® 269, Foam Blast® 338, Foam Blast® 290, Foam Blast® 332, Foam Blast® 349, Foam Blast® 550 and Foam Blast® 339. Suitable defoamers also include, but are not limited to, Foam-A-Tac® defoamers available from Enterprise Specialty Products, including Foam-A-Tac® 6, Foam-A-Tac® 110, Foam-A-Tac® 213, Foam-A-Tac® 251, Foam-A-Tac® 402, Foam-A-Tac® 407, Foam-A-Tac® 414, Foam-A-Tac® 417, Foam-A-Tac® 435, Foam-A-Tac® 612, Foam-A-Tac® 613, Foam-A-Tac® 615, Foam-A-Tac® 642, Foam-A-Tac® 643, Foam-A-Tac® 943, and Foam-A-Tac® PCI. For instance, defoamers can be used in an amount of 0.5 PHR, or less, for example, 0.05 PHR, 0.04 PHR, 0.03 PHR, 0.02 PHR, or 0.01 PHR.

Antioxidants

The water-soluble film disclosed herein can further include an antioxidant, for example, as a chloride scavenger. For example, suitable antioxidants/chloride scavengers include sulfite, bisulfite, thiosulfate, thiosulfate, iodide, nitrite, carbamate, ascorbate, and combinations thereof. The antioxidant can comprise propyl gallate (PGA), citric acid (CA), sodium metabisulfite (SMBS), carbamate, ascorbate, or a combination thereof. The antioxidant can be included in the film in an amount in a range of about 0.25 to about 1.5 PHR, for example, about 0.25 PHR, about 0.30 PHR, about 0.35 PHR, about 0.40 PHR, about 0.45 PHR, about 0.5 PHR, about 0.75 PHR, about 1.0 PHR, about 1.25 PHR, or about 1.5 PHR.

Fillers

Fillers can be included in the water-soluble films and can include bulking agents, extenders, antiblocking agents, detackifying agents and combinations thereof. Suitable fillers for use in the water-soluble films disclosed herein include, but are not limited to, starches, modified starches, crosslinked polyvinylpyrrolidone, crosslinked cellulose, microcrystalline cellulose, silica, metallic oxides, calcium carbonate, talc, mica, stearic acid, and metal salts thereof, for example, magnesium stearate. The amount of filler/extender/antiblocking agent/detackifying agent in the water-soluble film can be in a range of about 1 wt. % to about 6 wt. %, or about 1 wt. % to about 4 wt. %, or about 2 wt. % to about 4 wt. %, or about 1 PHR to about 6 PHR, or about 1 PHR to about 4 PHR, or about 2 PHR to about 4 PHR, for example.

The water-soluble film can include 2 or more PHR (e.g., 2 PHR to 6 PHR or 2 PHR to 4 PHR) of a filler. For instance, the film can include 2 or more PHR (e.g., 2 PHR to 6 PHR or 2 PHR to 4 PHR) of a filler and the filler can comprise a bulking agent, an antiblocking agent, or a combination thereof. Without intending to be bound by theory, it is believed that the inclusion of 2 or more PHR (e.g., 2 PHR to 6 PHR or 2 PHR to 4 PHR) of a filler can be useful to prevent weeping or migration of plasticizer out of the film, when the plasticizer is included in an amount of greater than or equal to 30 PHR, for example, in a range of 30 PHR to 50 PHR.

The water-soluble film can be free of a binder. As used herein, "binder" refers to a polymer that can improve the binding of two film layers to each other. A binder can be a component of a film layer comprising a multi-layer film. Typical binders include modified celluloses, such as carboxymethyl cellulose and alkyl- and hydroxyalkyl-modified celluloses and methylcelluloses, and natural gums such as gum arabic. The water-soluble film of the disclosure can be free of celluloses, modified celluloses, and natural gums. As used herein, and unless specified otherwise, a water-soluble film is "free of a binder" and/or "free of celluloses, modified celluloses, and natural gums" if the film includes less than 0.05 wt % of a binder or cellulose, modified cellulose, and natural gum, respectively, based on the total weight of the film.

An anti-block agent (e.g., $SiO_2$ and/or stearic acid) can be present in the film in an amount of at least 0.1 PHR, or at least 0.5 PHR, or at least 1 PHR, or in a range of about 0.1 to 5.0 PHR, or about 0.1 to about 3.0 PHR, or about 0.4 to 1.0 PHR, or about 0.5 to about 0.9 PHR, or about 0.5 to about 2 PHR, or about 0.5 to about 1.5 PHR, or 0.1 to 1.2 PHR, or 0.1 to 2.7 PHR, for example 0.5 PHR, 0.6 PHR, 0.7 PHR, 0.8 PHR, or 0.9 PHR.

A suitable median particle size for the anti-block agent includes a median size in a range of about 3 or about 4 microns to about 11 microns, or about 4 to about 8 microns, or about 5 to about 6 microns, for example 5, 6, 7, 8, or 9 microns.

Aversive Agents

Aversive agents may be incorporated within the water-soluble film or may be applied as a coating to the water-soluble film. An aversive compound such as a bitterant or a pungent may be added as a deterrent to ingestion of the film by a child or animal. The bitterant adds a bitter taste to the composition to which it is added. Suitable bitterants include denatonium salts (e.g., denatonium benzoate, denatonium saccharide, denatonium chloride), sucrose octaacetate, quinine, flavonoids (e.g., quercetin, naringen), and quassinoids (e.g., quassin, brucine). The pungent adds a sharp biting taste when ingested and a burning sensation when topically applied to and skin. Suitable pungents include capsaicin, piperine, allyl isothiocyanate, and resiniferatoxin. Suitable levels of incorporation vary according to the particular bitterant or pungent material. As understood by the skilled artisan, the aversive component should be incorporated as a level sufficiently high to impart the unpleasant taste or sensation, yet sufficiently low to avoid potential toxicity from the aversive itself. The aversive agent may be diluted from commercial form or otherwise mixed with a solvent for ease in mixing with other water-soluble film components or applying as a coating to the water-soluble film. Such solvents may be selected from water, lower molecular weight alcohols (methanol, ethanol, etc.) or plasticizers disclosed herein.

Methods of Making Films

The water-soluble films including the water-soluble resins disclosed herein can be made by any suitable method. Processes for making water-soluble films and pouches include solvent casting, blow-molding, extrusion and blown extrusion, as known in the art. Processes for solvent casting of PVOH are well-known in the art. For example, in the film-forming process, the polyvinyl alcohol resin(s) and secondary additives are dissolved in a solvent, typically water, metered onto a surface, allowed to substantially dry (or force-dried) to form a cast film, and then the resulting cast film is removed from the casting surface. The process can be performed batchwise, and is more efficiently performed in a continuous process.

In the formation of continuous films of polyvinyl alcohol, it is the conventional practice to meter a solution of the solution onto a moving casting surface, for example, a continuously moving metal drum or belt, causing the solvent to be substantially removed from the liquid, whereby a self-supporting cast film is formed, and then stripping the resulting cast film from the casting surface. The solution can optionally be metered or coated onto a carrier film, release liner, or removable backing, whereby after solvent removal, the resulting cast film or coating can be separated from the carrier film, release liner, or removable backing (for example, immediately upon drying or at a later point in time, e.g., prior to use) or remain attached to the carrier film, release liner, or removable backing.

A film according to the disclosure herein can be produced by solvent casting, e.g., using a solvent band casting system. The system can include a tank for mixing and/or storing a polymer solution, having optional secondary additives, for use with a band casting machine having at least a first and a second rotating drums about which a continuous band (e.g., metal band) is tensioned to travel with the rotation of the drums. A sheeting die can apply the polymer solution from the tank to the metal band where a drying chamber, enclosing at least a portion of the metal band downline of the sheeting die, is used to remove solvent from the polymer solution as it travels in a thin sheet on the metal band. In addition, a release coating can be used to provide one or more advantages to the film and/or the process. For example, the release coating can substantially reduce or eliminate bubbles in the produced polymer film, or the release coating can improve the ease of release of the produced film from the casting surface. A roll coater release coating applicator in communication with a supply of a release coating and a portion of the band can transfer fluid release coating to the casting surface prior to application of the polymer solution to the band. A suitable solvent band casting system and related materials are further described in U.S. Patent Application Publication Nos. 2006/0081176 A1 and 2007/0085234 A1, the disclosures of which are incorporated herein by reference in their entireties.

In general, the casting surface can be any suitable substrate for producing polymeric films to one of skill in the art. The substrate can be a casting roller or drum, a casting belt, or a combination thereof. As used herein, the substrate is used for producing a polymer film from a polymer resin or polymer resin solution. The substrate comprises a substrate surface and the substrate surface is coated with a release coating. The polymer resin solution can be cast onto a substrate while the substrate is moving, e.g., rotating. The substrate can be a casting drum. The substrate can be a casting belt. The substrate can comprise stainless steel, and optionally can have a stainless steel surface. The substrate can comprise stainless steel that is optionally plated, e.g., chrome plated, nickel plated, zinc plated or a combination thereof.

Optionally, the water-soluble film can be a free-standing film consisting of one layer or a plurality of like layers.

Optionally, the water-soluble film can be a foamed film, that is, that is, a film that includes a plurality of macroscopic and/or microscopic voids. A foamed film can be produced, for instance, by casting a layer of a foamed resin solution (that is, a resin solution in which air or another gas has been entrained) and drying the foamed resin solution layer to provide a film containing a plurality of macroscopic and/or microscopic voids.

Thermal Properties

The films of the disclosure can generally be characterized by one or more thermal properties, including but not limited to glass transition temperature, melting temperature, crystallization temperature, enthalpy of melting, and enthalpy of crystallization. Methods of determining these thermal properties are well known in the art, for instance, by differential scanning calorimetry (DSC).

In general, water-soluble films of the disclosure can differ in one or more thermal properties compared to otherwise identical water-soluble films not comprising a metal salt. Such differences in thermal properties can provide a benefit in applications, such as thermoforming or dissolution in cold water, that relate to thermal properties of the film.

Water-soluble films of the disclosure can have an enthalpy of melting that is at least 20% less, or at least 25% less, or at least 40% less, or at least 50% less, or at least 75% less, than the enthalpy of melting of an otherwise identical film not comprising a metal salt. Alternatively, water-soluble films of the disclosure can exhibit no melting transition as determined by DSC and not have an enthalpy of melting.

Water-soluble films of the disclosure can have a crystallization temperature that is at least 5° C. less than, or at least 10° C. less than, or at least 20° C. less than, or at least 30° C. less than, or at least 40° C. less than, the crystallization temperature of an otherwise identical film not comprising the metal salt. Alternatively, water-soluble films of the disclosure can exhibit no crystallization temperature as determined by DSC.

Water-soluble films of the disclosure can have an enthalpy of crystallization of less than about 50 J/g, or less than about 30 J/g, or less than about 20 J/g, or less than about 15 J/g, or less than about 10 J/g, or less than about 1 J/g, or 0 J/g (i.e., not detectable by DSC). The enthalpy of crystallization of a water-soluble film of the disclosure can be less than the enthalpy of crystallization of an otherwise identical water-soluble film not having a metal salt. Alternatively, the water-soluble films of the disclosure can exhibit no enthalpy of crystallization as determined by DSC.

Without intending to be bound by theory, it is believed that reducing the enthalpy of melting and/or enthalpy of crystallization of a water-soluble film can provide a film with improved thermoformability, for instance, a film that can be thermoformed at a temperature lower than that typically required to thermoform a film, for instance, less than 90° C.

Mechanical Properties

Water-soluble films of the disclosure can be characterized by a tensile strength, as determined by the Tensile Strength Test described herein. In general, the water-soluble films of the disclosure have a tensile strength of at least about 20 $N/mm^2$, or at least about 25 $N/mm^2$, or at least about 30 $N/mm^2$. Water-soluble films of the disclosure can have a tensile strength in a range of about 20 to about 200 $N/mm^2$, about 20 to about 100 $N/mm^2$, about 20 to about 50 $N/mm^2$, about 25 to about 200 $N/mm^2$, about 25 to about 100 $N/mm^2$, about 25 to about 50 $N/mm^2$, about 30 to about 200 $N/mm^2$, about 30 to about 100 $N/mm^2$, or about 30 to about 50 $N/mm^2$. Generally, higher tensile strength values are desirable because they correspond to stronger pouch seals when the film is the limiting or weakest element of a seal.

Water-soluble films of the disclosure can be characterized by a Young's modulus, as determined by the Tensile Strength Test described herein. In general, the water-soluble films of the disclosure have a Young's modulus of at least about 40 $N/mm^2$, or about 50 $N/mm^2$, or about 60 $N/mm^2$, or about 100 $N/mm^2$, or about 200 $N/mm^2$. The water-soluble film can be characterized by having a Young's modulus in a range of from about 40 to about 1000 $N/mm^2$, about 40 to about 500 $N/mm^2$, about 40 to about 300 $N/mm^2$, about 40 to about 200 $N/mm^2$, about 50 to about 1000 $N/mm^2$, about 50 to about 500 $N/mm^2$, about 50 to about 300 $N/mm^2$, about 50 to about 200 $N/mm^2$, about 60 to about 1000 $N/mm^2$, about 60 to about 500 $N/mm^2$, about 60 to about 300 $N/mm^2$, about 60 to about 200 $N/mm^2$, about 100 to about 1000 $N/mm^2$, about 100 to about 500 $N/mm^2$, about 100 to about 300 $N/mm^2$, or about 100 to about 200 $N/mm^2$. In embodiments wherein the metal salt comprises a lithium salt, the water-soluble film can be characterized by having a Young's modulus in a range of from about 5 $N/mm^2$ to about 100 $N/mm^2$, about 10 $N/mm^2$ to about 50 $N/mm^2$, or about 20 $N/mm^2$ to about 30 $N/mm^2$. Generally, Young's modulus is a measure of the stiffness of the film, with higher Young's modulus indicating increased stiffness.

Without intending to be bound by theory, it is believed that the addition of a metal salt to a water-soluble film can alter thermal properties of the film, at least in part by disrupting the crystalline structure of the PVOH in the film. It is further believed that such changes in properties of a PVOH film can enable the film to be thermoformed at a lower minimum temperature compared to the minimum temperature required to thermoform an otherwise identical film not containing a multivalent metal salt.

The water-soluble films of the disclosure can be characterized by elongation at break (i.e., strain at break), as determined according to the Elongation at Break Test described herein. In general, the water-soluble films of the disclosure have a strain at break of at least about 25%, for example, at least about 50%, at least about 75%, at least about 100%, at least about 125%, at least about 150%, at least about 175%, at least about 200%, or at least about 225%. The water-soluble films of the disclosure can have an elongation at break in a range of about 25% to about 700%, 25% to about 600%, about 25% to about 500%, about 25% to about 250%, about 50% to about 700%, about 50% to about 600%, about 50% to about 500%, about 50% to about 400%, about 50% to about 300%, about 50% to about 250%, about 100% to about 700%, about 100% to about 600%, about 100% to about 500%, about 100% to about 400%, about 100% to about 300%, about 100% to about 250%, about 150% to about 700%, about 150% to about 600%, about 150% to about 500%, about 150% to about 400%, about 150% to about 300%, about 150% to about 250%, about 200% to about 700%, about 200% to about 600%, about 200% to about 500%, about 200% to about 300%, about 250% to about 700%, about 250% to about 600%, about 250% to about 500%, about 250% to about 400%, about 250% to about 350%, about 300% to about 700%, 300% to about 600%, about 300% to about 500%, about 300% to about 450%, about 350% to about 700%, about 350% to about 500%, about 350% to about 450%, or about 350% to about 400%, or about 400% to about 500%. Generally, increasing elongation at break is indicative of a film that can withstand greater deformation before mechanical failure.

Water-soluble films of the disclosure can have dissolution and disintegration times, as measured by the Dissolution and Disintegration Test described herein, of less than about 300 s, less than about 250 s, less than about 200 s, or less than about 150 s, or less than about 100 s, or less than about 50 s. A water-soluble film of the disclosure can have a disintegration time that is less than the disintegration time of an otherwise identical film not containing a metal salt. A water-soluble film of the disclosure can have a dissolution time that is less than the dissolution time of an otherwise identical film not containing a metal salt.

Water-soluble films of the disclosure can exhibit faster disintegration and/or dissolution in salt water compared to otherwise identical water-soluble films not containing a metal salt. A water-soluble film of the disclosure, when provided at a thickness of about 76 microns, can have a disintegration time that is at least 30% less than, or at least 40% less than, or at least 45% less than, or at least 50% less than, the disintegration time of an otherwise identical film not containing the multivalent salt, wherein the disintegration times are measured according to MonoSol Test Method MSTM 205 at 5° C. in aqueous solutions of 3.5 wt. % sodium chloride. A water-soluble film of the disclosure, when provided at a thickness of about 76 microns, can have a dissolution time that is at least 30% less than, or at least 40% less than, or at least 45% less than, or at least 50% less than, the dissolution time of an otherwise identical film not containing the multivalent salt, wherein the dissolution times are measured according to MonoSol Test Method MSTM 205 at 5° C. in aqueous solutions of 3.5 wt. % sodium chloride.

Water-Soluble Articles

The film is useful for creating an article and/or pouch to contain a composition, for example, a cleaning composition. The composition contained in the pouch may take any form such as powders, gels, pastes, liquids, tablets, or any combination thereof. The film is also useful for any other application in which improved wet handling and low cold water residues are desired. The film forms at least one side wall of the article and/or pouch, optionally the entire article and/or pouch, and preferably an outer surface of the at least one sidewall.

The film described herein can also be used to make an article and/or pouch with two or more compartments made of the same film or in combination with films of other polymeric materials. Additional films can, for example, be obtained by casting, blow-molding, extrusion or blown extrusion of the same or a different polymeric material, as is known in the art. The polymers, copolymers or derivatives thereof suitable for use as the additional film can comprise polyvinyl alcohols, polyvinyl pyrrolidone, polyalkylene oxides, polyacrylic acid, cellulose, cellulose ethers, cellulose esters, cellulose amides, polyvinyl acetates, polycarboxylic acids and salts, polyaminoacids or peptides, polyamides, polyacrylamide, copolymers of maleic/acrylic acids, polysaccharides including starch and gelatin, natural gums such as xanthan, and carrageenans. For example, polymers can be selected from polyacrylates and water-soluble acrylate copolymers, methylcellulose, carboxymethylcellulose sodium, dextrin, ethylcellulose, hydroxyethyl cellulose, hydroxypropyl methylcellulose, maltodextrin, polymethacrylates, and combinations thereof, or selected from polyvinyl alcohols, polyvinyl alcohol copolymers and hydroxypropyl methyl cellulose (HPMC), and combinations thereof. For example, the level of polymer in the packet material, for example the PVOH copolymer described above, as described above, can be at least 60%.

In some aspects, the film of the disclosure is free of celluloses and modified celluloses. As used herein, and unless specified otherwise, "free of celluloses and modified celluloses" refers to a film having a content of cellulose and/or modified cellulose of less than 0.05%, based on the total weight of the film.

The articles and/or pouches of the present disclosure can include at least one sealed compartment. Thus, the articles and/or pouches may comprise a single compartment or multiple compartments. A water-soluble pouch or sachet can be formed from two layers of water-soluble polymer film sealed at an interface, or by a single film that is folded upon itself and sealed. One or both of the films can include the PVOH film described above. The films define an interior article and/or pouch container volume which contains any desired composition for release into an aqueous environment.

The pouch container volume is not particularly limited. The pouch container volume can be, for example, 25 mL or less. The pouch container volume can be less than 25 mL. The pouch container volume can be less than 50 mL.

The composition for use in the pouch is not particularly limited. For pouches comprising multiple compartments, each compartment may contain identical and/or different compositions, including but not limited to automatic dishwashing (ADW) compositions. In turn, the compositions may take any suitable form including, but not limited to liquid, solid and combinations thereof (e.g., a solid suspended in a liquid). The pouches can comprise a first, second, and third compartment, each of which respectively contains a different first, second, and third composition. Liquid detergents are particularly contemplated. Compositions comprising citric acid, including but not limited to liquid compositions comprising citric acid, solid compositions comprising citric acid, and citric acid itself, are particularly contemplated.

The compartments of multi-compartment articles and/or pouches may be of the same or different size(s) and/or volume(s). The compartments of the present multi-compartment articles and/or pouches can be separate or conjoined in any suitable manner. The second and/or third and/or subsequent compartments can be superimposed on the first compartment. The third compartment can be superimposed on the second compartment, which is in turn superimposed on the first compartment in a sandwich configuration. Alternatively, the second and third compartments may be superimposed on the first compartment. However, it is also equally envisaged that the first, second and optionally third and subsequent compartments may be attached to one another in a side by side relationship. The compartments may be packed in a string, each compartment being individually separable by a perforation line. Hence each compartment may be individually torn-off from the remainder of the string by the end-user, for example, so as to pre-treat or post-treat a fabric with a composition from a compartment. The first compartment can be surrounded by at least the second compartment, for example in a tire-and-rim configuration, or in a pouch-in-a-pouch configuration.

The articles and/or pouches of the present disclosure may comprise one or more different films. For example, for single compartment packets, the packet may be made from one wall that is folded onto itself and sealed at the edges, or alternatively, two walls that are sealed together at the edges. For multiple compartment packets, the article and/or packet may be made from one or more films such that any given packet compartment may comprise walls made from a single film or multiple films having differing compositions. A multi-compartment article and/or pouch can comprise at least three walls: an outer upper wall; an outer lower wall; and a partitioning wall. The outer upper wall and the outer lower wall are generally opposing and form the exterior of the article and/or pouch. The partitioning wall is interior to the article and/or pouch and is secured to the generally opposing outer walls along a seal line. The partitioning wall separates the interior of the multi-compartment article and/or pouch into at least a first compartment and a second compartment.

The single compartment or plurality of sealed compartments can contain a composition. The plurality of compartments may each contain the same or a different composition. The composition is selected from a liquid, solid or combination thereof.

The disclosure provides a unit dose article comprising at least one compartment and optionally a composition housed in the compartment, wherein at least one wall of the compartment comprises a water-soluble film of the disclosure.

Article and/or Pouch Contents

In general, the water-soluble articles of the disclosure can contain a household care product, a personal care product, or a non-household care product. The unit dose articles can include a composition housed in the compartment and the composition can comprise an oxidizing agent. The oxidizing agent can comprise a hypochlorite salt, a chloramine, a chlorinated isocyanurate, a brominated isocyanurate, a chlorate, a bromate, a perchlorate, a perbromate, calcium hydroxide, calcium chloride, a percarbonate, a perborate, a periodate, a persulfate, a permanganate, a chromate, a dichromate, a nitrate, a nitrite, a peroxide, a ketone peroxide, a peroxy acid, an inorganic acid, or a combination thereof. The oxidizing agent can comprise a hypochlorite salt, a chloramine, a chlorinated isocyanurate, calcium hydroxide, calcium chloride, a percarbonate, a perborate, a persulfate, a permanganate, a peroxide, a peroxy acid, or a combination thereof.

In general, contact between a water-soluble article comprising a polymer film and a liquid or solid composition packaged in the article can result in transfer of one or more components of the composition into the polymer film. Transfer of material from the composition to the polymer film can affect properties of the polymer film, including but not limited to solubility properties or mechanical properties. In particular, for a water-soluble article comprising a PVOH-based film and containing a composition that includes an organic acid, such as citric acid, a portion of the organic acid can be transferred to the PVOH-based film, and the organic acid can partially crosslink the PVOH resin comprising the film. Added crosslinks can have effects on film properties, for instance increasing the solubility time of the film or making the film more brittle and more susceptible to premature breaking, and these effects can be undesirable for certain applications. Adding metal salt to a PVOH-based film, as described herein, can mitigate such effects. Without intending to be bound by theory, it is believed cations from a metal salt present in a PVOH-based film can coordinate acid groups from an organic acid that has been transferred into the film, reducing the availability of acid groups to crosslink the PVOH.

Methods of Making Articles

Articles, such as pouches or packets, may be made using any suitable equipment and method. For example, single compartment pouches may be made using vertical form filling, horizontal form filling, or rotary drum filling techniques commonly known in the art. Such processes may be either continuous or intermittent. The film may be dampened, and/or heated to increase the malleability thereof. The method may also involve the use of a vacuum to draw the film into a suitable mold. The vacuum drawing the film into the mold can be applied for about 0.2 to about 5 seconds, or about 0.3 to about 3, or about 0.5 to about 1.5 seconds, once the film is on the horizontal portion of the surface. This vacuum can be such that it provides an under-pressure in a range of 10 mbar to 1000 mbar, or in a range of 100 mbar to 600 mbar, for example.

The molds in which packets may be made can have any shape, length, width, and depth, depending on the required dimensions of the pouches. The molds may also vary in size and shape from one to another, if desirable. For example, the volume of the final pouches may be about 5 mL to about 300 mL, or about 10 mL to 150 mL, or about 20 mL to about 100 mL, and the mold sizes can be adjusted accordingly.

Thermoforming

A thermoformable film is one that can be shaped through the application of heat and a force. Thermoforming a film is the process of heating the film, shaping it (e.g., in a mold), and then allowing the film to cool, whereupon the film will hold its shape, e.g., the shape of the mold. The heat may be applied using any suitable means. For example, the film may be heated directly by passing it under a heating element or through hot air, prior to feeding it onto a surface or once on a surface. Alternatively, it may be heated indirectly, for example by heating the surface or applying a hot item onto the film. The film can be heated using an infrared light. The film may be heated to a temperature in a range of about 50° C. to about 150° C., about 50° C. to about 120° C., about 60° C. to about 130° C., about 70° C. to about 120° C., or about 60° C. to about 90° C. The film may be heated to a temperature in a range of about 30° C. to about 100° C., or about 40° C. to about 100° C., or about 50° C. to about 100° C., or about 60° C. to about 100° C., or about 30° C. to about 90° C., or about 40° C. to about 90° C., or about 50° C. to about 90° C. The film may be heated to temperature in a range of about 30° C. to about 80° C., or about 40° C. to about 80° C., or about 50° C. to about 80° C., or about 60° C. to about 80° C., or about 30° C. to about 70° C., or about 30° C. to about 60° C., or about 30° C. to about 50° C. Thermoforming can be performed by any one or more of the following processes: the manual draping of a thermally softened film over a mold, or the pressure induced shaping of a softened film to a mold (e.g., vacuum forming), or the automatic high-speed indexing of a freshly extruded sheet having an accurately known temperature into a forming and trimming station, or the automatic placement, plug and/or pneumatic stretching and pressuring forming of a film.

Alternatively, the film can be wetted by any suitable means, for example directly by spraying a wetting agent (including water, a solution of the film composition, a plasticizer for the film composition, or any combination of the foregoing) onto the film, prior to feeding it onto the surface or once on the surface, or indirectly by wetting the surface or by applying a wet item onto the film.

Once a film has been heated and/or wetted, it may be drawn into an appropriate mold, preferably using a vacuum. The filling of the molded film can be accomplished by utilizing any suitable means. The most preferred method will depend on the product form and required speed of filling. The molded film can be filled by in-line filling techniques. The filled, open packets can then be closed forming the pouches, using a second film, by any suitable method. This may be accomplished while in horizontal position and in continuous, constant motion. The closing may be accomplished by continuously feeding a second film, preferably water-soluble film, over and onto the open packets and then preferably sealing the first and second film together, typically in the area between the molds and thus between the packets.

Sealing of Water-Soluble Articles

Any suitable method of sealing the packet and/or the individual compartments thereof may be utilized. Non-limiting examples of such means include heat sealing, solvent welding, solvent or wet sealing, and combinations thereof. Typically, only the area which is to form the seal is treated with heat or solvent. The heat or solvent can be applied by any method, typically on the closing material, and typically only on the areas which are to form the seal. If solvent or wet sealing or welding is used, it may be preferred that heat is also applied. Preferred wet or solvent sealing/welding methods include selectively applying solvent onto the area between the molds, or on the closing material, by for example, spraying or printing this onto these areas, and then applying pressure onto these areas, to form the seal. Sealing rolls and belts (optionally also providing heat) can be used, for example.

An inner film can be sealed to outer film(s) by solvent sealing. The sealing solution is generally an aqueous solution. The sealing solution can comprise water. The sealing solution can comprise water and can further include one or more diols and/or glycols such as 1,2-ethanediol (ethylene glycol), 1,3-propanediol, 1,2-propanediol, 1,4-butanediol (tetramethylene glycol), 1,5-pantanediol (pentamethylene glycol), 1,6-hexanediol (hexamethylene glycol), 2,3-butanediol, 1,3-butanediol, 2-methyl-1,3-propanediol, various polyethylene glycols (e.g., diethylene glycol, triethylene glycol), and combinations thereof. The sealing solution can comprise erythritol, threitol, arabitol, xylitol, ribitol, mannitol, sorbitol, galactitol, fucitol, iditol, inositol, volemitol, isomalt, maltitol, lactitol.

The sealing solution can be applied to the interfacial areas of the inner film in any amount suitable to adhere the inner and outer films. As used herein, the term "coat weight" refers to the amount of sealing solution applied to the film in grams of solution per square meter of film. In general, when the coat weight of the sealing solvent is too low, the films do not adequately adhere and the risk of pouch failure at the seams increases. Further, when the coat weight of the sealing solvent is too high, the risk of the solvent migrating from the interfacial areas increases, increasing the likelihood that etch holes may form in the sides of the pouches. The coat weight window refers to the range of coat weights that can be applied to a given film while maintaining both good adhesion and avoiding the formation of etch holes. A broad coat weight window is desirable as a broader window provides robust sealing under a broad range of operations. Suitable coat weight windows are at least about 3 g/m², or at least about 4 g/m², or at least about 5 g/m², or at least about 6 g/m².

Fibers

Compositions described herein for the films of the disclosure can be used as compositions of fibers.

Fibers having the same composition as films of the disclosure are also contemplated. Such fibers can comprise a polyvinyl alcohol resin, a plasticizer, and a metal salt as described herein. The polyvinyl alcohol resin of a fiber of the disclosure is not particularly limited and can include, for instance, one or more polyvinyl alcohol homopolymer, one or more polyvinyl alcohol copolymers, or a blend thereof. The fibers can include any of the secondary ingredients disclosed herein for the films of the disclosure. For example, fibers can comprise surfactants, lubricants, release agents, fillers, extenders, cross-linking agents, antiblocking agents, antioxidants, detackifying agents, antifoams, nanoparticles such as layered silicate-type nanoclays (e.g., sodium montmorillonite), bleaching agents (e.g., sodium metabisulfite, sodium bisulfite or others), aversive agents such as bitterants, pungents, or combinations of any of the foregoing, in amounts suitable for their intended purposes.

Methods of making fibers are known in the art. For instance, U.S. Patent Application Publication No. 2022/0228305A1 describes wet cooled gel spinning, thermoplastic fiber spinning, and melt spinning methods for preparing fibers containing a water-soluble polymer or blend of water-soluble polymers. Such methods are generally suitable for making fibers according to the disclosure.

Fibers of the disclosure can be used as components of a nonwoven web comprising a plurality of fibers. A nonwoven web generally refers to an arrangement of fibers bonded to one another, wherein the fibers are neither woven nor knitted. In general, the plurality of fibers can be arranged in any orientation. The plurality of fibers can be arranged randomly (i.e., without having an orientation). The plurality of fibers can be arranged in a unidirectional orientation. The plurality of fibers can be arranged in a bidirectional orientation. The plurality of fibers can be multi-directional, having different arrangements in different areas of the nonwoven web.

The disclosure provides a unit dose article comprising at least one compartment and optionally a composition housed in the compartment, wherein at least one wall of the compartment comprises a non-woven web of the disclosure.

Without intending to be bound by theory, it is believed that incorporating a metal salt into fibers comprising a polyvinyl alcohol resin can provide benefits to the fibers or to nonwoven webs or other compositions comprising the fibers, as described herein for films comprising a polyvinyl alcohol resin and a metal salt. Such benefits can include but are not limited to improvements in mechanical and thermal properties.

Conductivity/Resistance

Films, fibers, and/or nonwoven webs of the disclosure can undergo an increase in conductivity upon exposure to water or a humid environment. An increase in conductivity of a film can be detected, for instance, by measuring a decrease in resistance across a film upon exposure to water or to a humid environment. Exposure to water or a humid environment can include, for example, immersing a film in water or storing a film in an environment having high relative humidity, for instance greater than 50% relative humidity (RH). Water-soluble films without added salts and films of the disclosure can have a resistance in a dry state (for example, measured after being conditioned at elevated temperature to reduce or remove water content of the film) of greater than 60 MΩ (megaohms), or greater than 40 MΩ, or greater than 20 MΩ. Advantageously, upon exposure to water or a humid environment, films of the disclosure can have a resistance of less than 60 MΩ, or less than 40 MΩ, or less than 20 MΩ, or less than 10 MΩ, or less than 5 MΩ, or less than 1 MΩ, or less than 100 kΩ, or less than 50 kΩ, or less than 10 kΩ, or less than 5 kΩ, or less than 1 kΩ. Polymer films, fibers, and/or nonwoven webs for which conductivity and resistance change upon exposure to water or a humid environment can find use in applications such as sensing, flexible electronics, and smart fabrics.

A film of the disclosure can advantageously have a resistance in a dry state (i.e., a resistance measured on a sample of the film immediately after conditioning the sample for at least 24 hr in a 23° C./35% RH environment, as described herein) that is less than the resistance of a water-soluble film that does not include a salt. A film of the disclosure can have, for example, a resistance of less than about 60 MΩ, or less than about 50 MΩ, or less than about 40 MΩ, or less than about 30 MΩ.

The table below lists contemplated articles according to the disclosure, including compositional details, physical properties, and potential applications. These examples are included for purposes of illustration and are not intended to be limiting.

| Article type | PVOH | Metal salt | Amounts / ranges of salt | Physical Properties | Applications |
| --- | --- | --- | --- | --- | --- |
| Film, nonwoven web | Homopolymer, high (>90%) DH | Cation; organic or inorganic anion | 1-30 phr | Non-water soluble or only hot-water soluble; conductive under high-humidity conditions | Conductive wearables, flexible electronics, sensors |

| Article type | PVOH | Metal salt | Amounts / ranges of salt | Physical Properties | Applications |
|---|---|---|---|---|---|
| Film, nonwoven web | Homopolymer, high (>90%) DH | Cation; organic or inorganic anion | 1-30 phr | Non-water soluble or hot-water soluble | Electrostatic dissipative (ESD) protection of sensitive electronic equipment and other components |

Test Methods

Dissolution and Disintegration Test (MSTM 205)

A film can be characterized by or tested for Dissolution Time and Disintegration Time according to the MonoSol Test Method 205 (MSTM 205), a method known in the art. See, for example, U.S. Pat. No. 7,022,656. Apparatus and Materials:
600 mL Beaker
Magnetic Stirrer (Labline Model No. 1250 or equivalent)
Magnetic Stirring Rod (5 cm)
Thermometer (0 to 100° C.±1° C.)
Template, Stainless Steel (3.8 cm×3.2 cm)
Timer (0-300 seconds, accurate to the nearest second)
Polaroid 35 mm slide Mount (or equivalent)
MonoSol 35 mm Slide Mount Holder (or equivalent)
Distilled Water All films to be tested were conditioned for a minimum of 24 hours in a 23° C./35% relative humidity environment. For each film to be tested, three test specimens are cut from a film sample that is a 3.8 cm×3.2 cm specimen. If cut from a film web, specimens should be cut from areas of web evenly spaced along the traverse direction of the web. Each test specimen is then analyzed using the following procedure.

Lock each specimen in a separate 35 mm slide mount.

Fill beaker with 500 mL of distilled water. Measure water temperature with thermometer and, if necessary, heat or cool water to maintain the target water temperature for the test. Disintegration and dissolution tests were conducted in water at about 5° C. (about 41° F.) unless noted otherwise. Mark height of column of water. Place magnetic stirrer on base of holder. Place beaker on magnetic stirrer, add magnetic stirring rod to beaker, turn on stirrer, and adjust stir speed until a vortex develops which is approximately one-fifth the height of the water column. Mark depth of vortex.

Secure the 35 mm slide mount in the alligator clamp of the 35 mm slide mount holder such that the long end of the slide mount is parallel to the water surface. The depth adjuster of the holder should be set so that when dropped, the end of the clamp will be 0.6 cm below the surface of the water. One of the short sides of the slide mount should be next to the side of the beaker with the other positioned directly over the center of the stirring rod such that the film surface is perpendicular to the flow of the water.

In one motion, drop the secured slide and clamp into the water and start the timer. Disintegration occurs when the film breaks apart. When all visible film is released from the slide mount, raise the slide out of the water while continuing to monitor the solution for undissolved film fragments. Dissolution occurs when all film fragments are no longer visible and the solution becomes clear.

The results should include the following: complete sample identification; individual and average disintegration and dissolution times; and water temperature at which the samples were tested.

Film disintegration times (I) and film dissolution times(S) can be corrected to a standard or reference film thickness using the exponential algorithms shown below in Equation 1 and Equation 2, respectively.

$$I_{corrected} = I_{measured} \times \left(\text{reference thickness/measured thickness}\right)^{1.93} \quad [1]$$

$$S_{corrected} = S_{measured} \times \left(\text{reference thickness/measured thickness}\right)^{1.83} \quad [2]$$

Films were also tested for disintegration and dissolution in salt water. For these experiments, the MSTM-205 method was carried out as described above, except that films were immersed in 500 mL of a solution of 3.5% sodium chloride in distilled water at 5° C., instead of 500 mL of distilled water at 5° C. Disintegration and dissolution times in salt water were determined using the same criteria used to determine disintegration and dissolution times in water.

DSC Method (MSTM 122)

Tests are performed using a TA Instruments Q2000 differential scanning calorimeter (DSC) or equivalent with a 50 mL/min nitrogen purge and TZERO aluminum hermetic pans (available from TA Instruments) to avoid weight losses during temperature ramping. Film specimens to be tested are cut in small pieces to provide about 3-5 mg total sample that fits into the pans (e.g., about 3 stacked, cut film pieces). The DSC test is performed by equilibrating the sample at −80° C., followed by (1) heating the sample to 75° C. at a rate of 10° C./min to begin generating a first DSC heating curve, (2) maintaining the sample at 75° C. for 10 minutes, (3) heating the sample from 75° C. to 200° C. at a rate of 10° C./min to complete a first DSC heating curve, (4) cooling the sample to −75° C. at a rate of −5° C./min to generate a DSC cooling curve, and optionally (5) re-heating the sample to 200° C. at a rate of 10° C./min to generate a second DSC heating curve. Upon generating the curves, transitions attributable to glass transition, melting, and crystallization are assigned; glass transition temperature, melting temperature, and crystallization temperature (Tg, Tm, and Tc, respectively) are determined from the first DSC heating curve; and enthalpies of melting or crystallization are determined according to standard calorimetry analysis.

Optionally, a second glass transition and a corresponding second glass transition temperature ($Tg_2$) for the sample can be determined from the second DSC heating curve generated during the re-heating step (5). The heating step (3) of the method for measuring Tg drives off substantially all water from the film specimen; accordingly, $Tg_2$ is a "dry" glass transition temperature, corresponding to a glass transition of the film after residual water has been driven off (i.e., during the first heating step).

Glass transitions can be identified from DSC data by methods known to those of skill in the art, such as ASTM E1356 or equivalents. In general, a glass transition can be identified from DSC data as a step change in the DSC heating curve during the heating step (3) (associated with Tg) and optionally during the re-heating step (5) (associated with $Tg_2$).

Tensile Strength Test

A water-soluble film characterized by or to be tested for tensile strength according to the Tensile Strength (TS) Test is analyzed as follows. The procedure includes the determination of tensile strength according to ASTM D 882 ("Standard Test Method for Tensile Properties of Thin Plastic Sheeting") or equivalent. An INSTRON tensile testing apparatus (Model 5544 Tensile Tester or equivalent) is used for the collection of film data. A minimum of three test specimens, each cut with reliable cutting tools to ensure dimensional stability and reproducibility, are tested in the machine direction (MD) (where applicable) for each measurement. Films to be tested are conditioned for a minimum of 24 hours in a 23±2.0° C. and 35±5% relative humidity environment; tensile strength tests are also conducted in a 23±2.0° C. and 35±5% relative humidity environment. For tensile strength, 1"-wide (2.54 cm) samples of a single film sheet having a thickness of 76 μm are prepared. The sample is then transferred to the INSTRON tensile testing machine to proceed with testing while minimizing exposure in the 35% relative humidity environment. The tensile testing machine is prepared according to manufacturer instructions, equipped with a 500 N load cell, and calibrated. The correct grips and faces are fitted (INSTRON grips having model number 2702-032 faces, which are rubber coated and 25 mm wide, or equivalent). The samples are mounted into the tensile testing machine and analyzed to determine tensile strength (i.e., stress required to break film).

Young's modulus was determined as the slope of a linear fit of stress-strain data over the range of 1-3% strain.

Elongation at Break Test

The procedure includes the determination of elongation at break based on ASTM D 882 ("Standard Test Method for Tensile Properties of Thin Plastic Sheeting") or equivalent. An INSTRON® tensile testing apparatus (Model 5544 Tensile Tester or equivalent) is used for the collection of film data. A minimum of three test specimens, each cut with reliable cutting tools to ensure dimensional stability and reproducibility, are tested in the machine direction (MD) (where applicable) for each measurement. Films to be tested are conditioned for a minimum of 24 hours in a 23±2.0° C. and 35±5% relative humidity environment; elongation at break tests are also conducted in a 23±2.0° C. and 35±5% relative humidity environment. For elongation at break determination, 1"-wide (2.54 cm) samples of a single film sheet having a thickness of 1.4±0.15 mil (about 35.6±3.8 μm) are prepared. The sample is then transferred to the INSTRON® tensile testing machine to proceed with testing while minimizing exposure in the 35% relative humidity environment. The tensile testing machine is prepared according to manufacturer instructions, equipped with a 500 N load cell, and calibrated. The correct grips and faces are fitted (INSTRON® grips having model number 2702-032 faces, which are rubber coated and 25 mm wide, or equivalent). The samples are mounted into the tensile testing machine and analyzed to determine the elongation at break (i.e., where Young's Modulus applies).

Resistance

Resistance of water-soluble films was measured using a digital multimeter, by clipping the multimeter leads to a film sample, with the leads positioned one inch apart. Measurements were made in triplicate. To ensure consistency, multiple resistance readings were taken with the leads clipped in different positions on the sample. In general, resistance was measured after conditioning the sample to be measured under fixed temperature and humidity conditions, as described herein. In particular, as used herein and unless specified otherwise, the resistance of a sample in a "dry state" refers to the resistance of the sample as measured immediately after conditioning the sample for at least 24 hr in a 23° C./35% RH environment.

Unless specified otherwise, films evaluated for resistance contained a salt, in an amount equimolar to 10 PHR of calcium chloride.

EXAMPLES

Water-soluble films were prepared via solution casting as described below. Films were tested for thermal properties (Tg, Tm, Tc, enthalpies of melting and crystallization) and mechanical properties (tensile strength, Young's modulus, % strain at break, disintegration and dissolution times) according to the test methods described herein.

Example 1

Films comprising PVOH homopolymer, plasticizers (i.e., polyol and sugar alcohol), additives, and optionally calcium chloride, in the amounts shown in Table 1, were prepared via solution casting. Amounts are shown in PHR. In the films of Examples 1b and 1c, 10 PHR of different components of the plasticizer blend in the film of Example 1a are replaced with 10 PHR of calcium chloride.

TABLE 1

| Amounts (PHR) | 1a | 1b | 1c |
| --- | --- | --- | --- |
| PVOH homopolymer | 100.0 | 100.0 | 100.0 |
| Polyol | 27.4 | 17.4 | 27.4 |
| Sugar alcohol | 10.0 | 10.0 | 0.0 |
| Additives | 2.4 | 2.4 | 2.4 |
| Calcium chloride | 0.0 | 10.0 | 10.0 |
| Properties | | | |
| Tg (° C.) | −4 | 9 | 11 |
| Tm (° C.) | 185 | — | — |
| Enthalpy of Melting (J/g) | 12.9 | — | — |
| Tc (° C.) | 135 | — | — |
| Enthalpy of Crystallization (J/g) | 17.2 | — | — |
| Disintegration time (s) | 41 | 27 | 29 |
| Dissolution time (s) | 79 | 55 | 58 |

Figure 2:
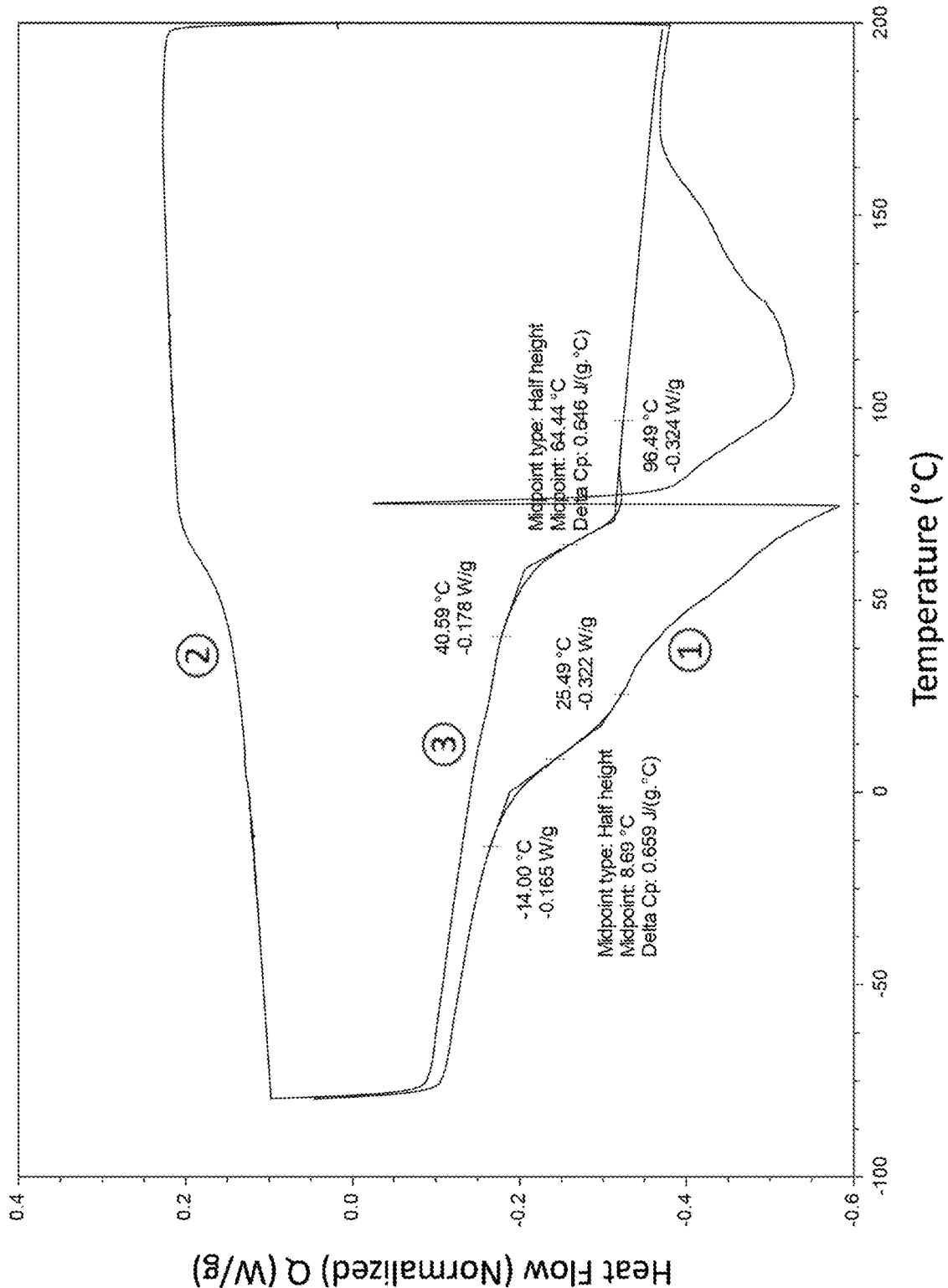
FIG. 2 shows a DSC trace of a water-soluble film of the disclosure as described in Example 1b.
Figure 3:
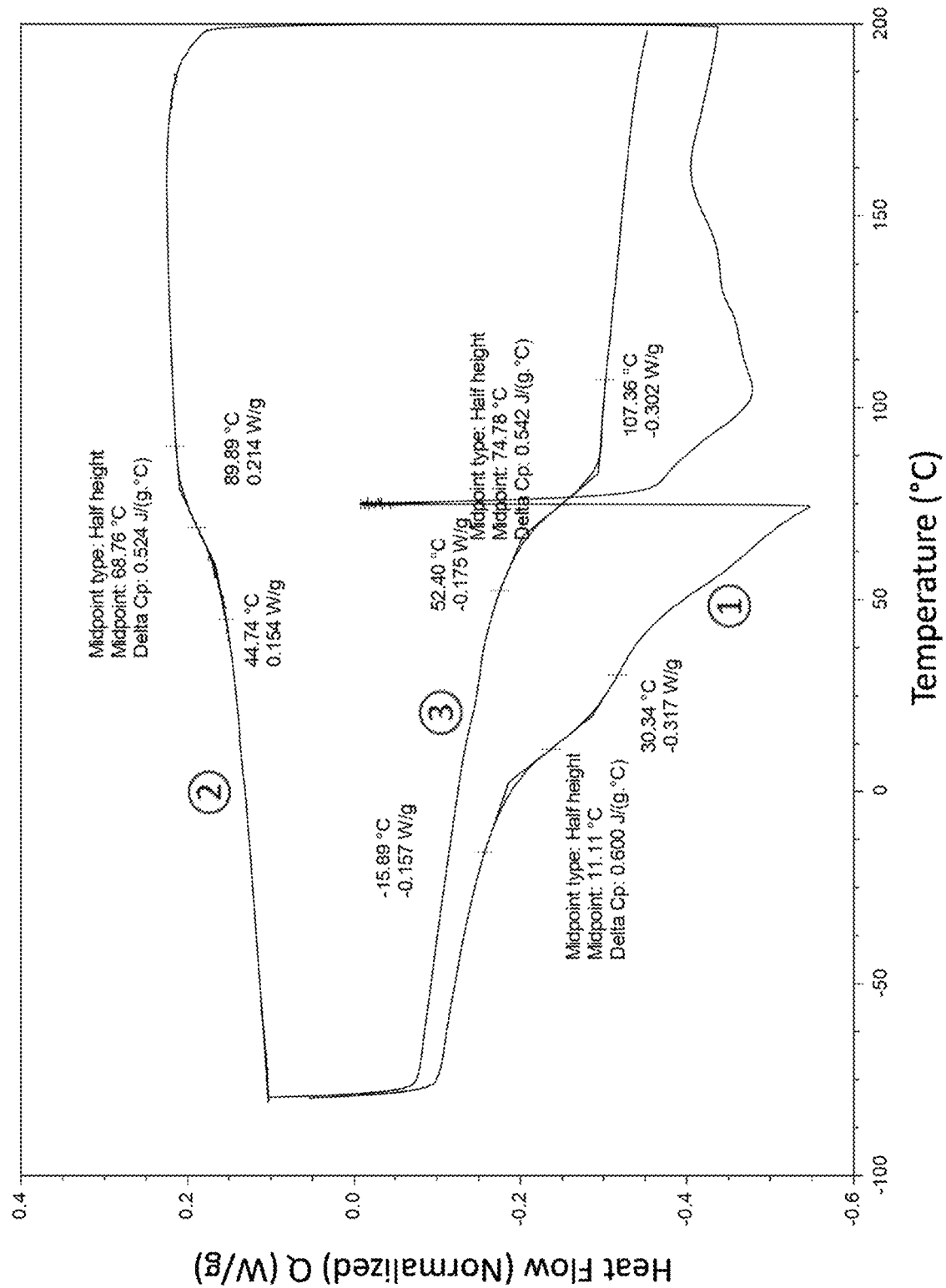
FIG. 3 shows a DSC trace of a water-soluble film of the disclosure as described in Example 1c.

Replacing sugar alcohol plasticizer or polyol plasticizer with calcium chloride affected physical and thermal properties of the resulting films. FIGS. 1-3 show DSC traces of Examples 1a-1c, respectively. The heating, cooling, and re-heating traces, generally described as steps (1), (2), and (3), respectively, in the DSC test method section above, are labelled accordingly as (1), (2), (3) on each of FIGS. 1-3. The DSC trace of Example 1a shows peaks attributed to melting and crystallization, while the DSC traces of Examples 1b and 1c do not show such transitions. As shown in Table 1, replacing the sugar alcohol plasticizer with calcium chloride also resulted in increasing glass transition temperature. Examples 1b and 1c also exhibited markedly faster disintegration and dissolution compared to the film not comprising calcium chloride.

Without intending to be bound by theory, it is believed that calcium chloride disrupted the crystallinity of the PVOH resin comprising Examples 1b and 1c to the extent that a discrete transition associated with melting and with crystallization upon cooling could not be observed by DSC. It is further believed that calcium chloride did not substantially plasticize the films, as evidenced by the increases in glass transition temperature compared to the film not comprising calcium chloride.

Thus, Example 1 shows films of the disclosure having improved thermal properties and faster solubility compared to a film not containing a metal salt.

Example 2

Films having increasing amounts of calcium chloride, comprising PVOH homopolymer, plasticizer, additives, and calcium chloride in the amounts shown in Table 2, were prepared via solution casting. Amounts are shown in PHR.

TABLE 2

|  | 2a | 2b | 2c | 2d | 2e | 2f | 2g |
|---|---|---|---|---|---|---|---|
| Amounts (PHR) | | | | | | | |
| PVOH homopolymer | 100.0 | 100.0 | 100.0 | 100.0 | 100.0 | 100.0 | 100.0 |
| Polyol | 18.0 | 18.0 | 18.0 | 18.0 | 18.0 | 18.0 | 18.0 |
| Sugar Alcohol | 8.0 | 8.0 | 8.0 | 8.0 | 8.0 | 8.0 | 8.0 |
| Additives | 0.8 | 0.8 | 0.8 | 0.8 | 0.8 | 0.9 | 0.8 |
| Calcium chloride | 0.0 | 2.1 | 4.1 | 8.1 | 10.0 | 16.1 | 24.1 |
| Properties | | | | | | | |
| Tensile Strength (N/mm$^2$) | 32.9 | 29.2 | 32.3 | 31.1 | 30.8 | 28.0 | 24.3 |
| Strain at Break (%) | 524 | 392 | 395 | 354 | 338 | 347 | 382 |
| Young's Modulus (N/mm$^2$) | 46.6 | 52.3 | 58.6 | 72.1 | 92.1 | 70.9 | 68.8 |
| Tg (° C.) | −11 | −11 | 2 | 5 | 7 | 10 | 15 |
| Tg$_2$ (° C.) | 21 | 28 | 39 | 50 | 56 | 69 | 88 |
| Tm (° C.) | 174 | 165 | 164 | 158 | 153 | — | — |
| Enthalpy of Melting (J/g) | 11.5 | 12.3 | 8.5 | 1.0 | 0.1 | — | — |
| Tc (° C.) | 121 | 107 | 98 | — | — | — | — |
| Enthalpy of Crystallization (J/g) | 10.9 | 13.9 | 12.2 | — | — | — | — |
| Disintegration time (s) | 43 | 40 | 32 | 31 | 31 | 27 | 23 |
| Dissolution time (s) | 78 | 76 | 78 | 64 | 56 | 58 | 45 |

Table 2 indicates that addition of calcium chloride had marked effects on some mechanical properties. Tensile strength was only minimally affected by addition of up to about 16 PHR of calcium chloride, though Young's modulus increased consistently over the same range of calcium chloride content. Above 16 PHR calcium chloride, both tensile strength and Young's modulus began to fall off. Strain at break was only minimally affected by addition of calcium chloride. While addition of 2 PHR resulted in a ~25% drop in strain at break compared to a film having no calcium chloride, increasing the calcium chloride content from 2 PHR to 24 PHR had little further effect on strain at break, indicating films remained highly flexible at all levels of added calcium chloride.

Adding calcium chloride also had marked effects on some thermal properties. Adding calcium chloride above 2 PHR increased the glass transition temperatures (both Tg and Tg$_2$), indicating that the addition of calcium chloride did not have a marked plasticizing effect on the films. However, adding calcium chloride up to 10 PHR decreased the melting temperature of the films, and the films comprising more than 10 PHR calcium chloride the films did not exhibit melting or crystallization transitions visible by DSC analysis, similar to the calcium chloride-containing films of Example 1.

Thus, Example 2 shows films of the disclosure that exhibit improved thermal properties with increasing metal salt concentration while maintaining excellent strength and flexibility.

Example 3

Films containing PVOH homopolymer, plasticizer, additives, and various salts, in the amounts shown in Table 3, were prepared by solution casting. Data for Example 2a, a film containing no added salt, and Example 2e, a film containing 10 PHR of calcium chloride, are included in the table for ease of comparison. Examples 3a-3d contained magnesium chloride, calcium acetate (Ca(OAc)$_2$), manganese acetate (Mn(OAc)$_2$), and sodium chloride, respectively, in an amount equimolar to the 10 PHR of calcium chloride in Example 2e. Amounts are shown in PHR. Because the salts have different molar masses, equimolar amounts of each salt have different weights, as indicated in the table by the differing PHR levels of salt in each film.

TABLE 3

|  | 2a | 2e | 3a | 3b | 3c | 3d |
|---|---|---|---|---|---|---|
| salt: | None | CaCl$_2$ | MgCl$_2$ | Ca(OAc)$_2$ | Mn(OAc)$_2$ | NaCl |
| Amounts (PHR) | | | | | | |
| PVOH homopolymer | 100.0 | 100.0 | 100.0 | 100.0 | 100.0 | 100.0 |
| Polyol | 18.0 | 18.0 | 18.0 | 18.0 | 18.0 | 18.0 |
| Sugar Alcohol | 8.0 | 8.0 | 8.0 | 8.0 | 8.0 | 8.0 |
| Additives | 0.8 | 0.8 | 0.8 | 0.8 | 0.9 | 0.8 |
| Salt | 0.0 | 10.0 | 8.7 | 14.4 | 15.7 | 5.3 |
| Properties | | | | | | |
| Tensile Strength (N/mm$^2$) | 32.9 | 30.8 | 35.8 | 37.7 | 37.5 | 36.8 |
| Strain at Break (%) | 524 | 338 | 296 | 356 | 362 | 336 |

TABLE 3-continued

|  | 2a | 2e | 3a | 3b | 3c | 3d |
|---|---|---|---|---|---|---|
| Young's Modulus (N/mm$^2$) | 46.6 | 92.1 | 134 | 382 | 112 | 74.0 |
| Tg (° C.) | −11 | 7 | 24 | 18 | 31 | 9 |
| Tg$_2$ (° C.) | 21 | 56 | 66 | 29 | 39 | 34 |
| Tm (° C.) | 174 | 153 | — | 174 | 182 | 165 |
| Enthalpy of Melting (J/g) | 11.5 | 0.1 | — | 6.6 | 5.7 | 5.5 |
| Tc (° C.) | 121 | — | — | 124 | 142 | 118 |
| Enthalpy of Crystallization (J/g) | 10.9 | — | — | 16.5 | 17.3 | 12.0 |
| Disintegration time (s) | 43 | 31 | 31 | 42 | 41 | 40 |
| Dissolution time (s) | 78 | 56 | 60 | 77 | 69 | 74 |

The addition of different salts had varying effects on thermal properties of the resulting films. The magnesium chloride-containing film, Example 3a, did not exhibit discrete transitions associated with melting or crystallization, and thus enthalpies of melting and crystallization could not be determined. This is similar to the behavior of the film of Example 2e, containing calcium chloride, for which no crystallization transition and only a weak melting transition were detected. In this respect, calcium and magnesium chlorides had more pronounced effects on melting and crystallization of the films than the divalent acetate salts (Examples 3b and 3c) and a monovalent chloride salt (Example 3d).

The addition of each salt increased film Tg compared to the film having no added salt. The increase in Tg was most pronounced for the magnesium and manganese salts. In view of the increases in Tg, none of the added salts served to substantially plasticize the PVOH films.

With some exceptions, mechanical properties of the films were generally less sensitive than thermal properties to the addition of salt or to the choice of added salt. Each salt-containing film exhibited a strain at break that was ~30-45% lower than that of the film containing no added salt (2a), indicating that the addition of salt reduced the elasticity of the films, though there was not a marked difference in % strain at break among the salt-containing films. Tensile strengths of all but one of the salt-containing films were higher than that of the salt-free film; with the exception of the calcium chloride-containing film, which had a slightly lower tensile strength than the salt-free film, tensile stress was not very sensitive to the choice of added salt. All salt-containing films also exhibited higher Young's moduli than the salt-free film, and there was a more pronounced dependence on the choice of salt: the calcium acetate-containing film exhibited a nearly 10× increase compared to the salt-free film, and the other salt-containing films exhibited ~2-4× increases.

The films containing divalent chloride salts, Examples 2e and 3a, also exhibited faster disintegration and dissolution than the salt-free film. The other salts had minimal effect on disintegration and dissolution times.

Thus, Example 3 shows metal salt-containing films according to the disclosure that exhibit excellent mechanical properties and improved thermal properties compared to a film that does not contain an added metal salt. Example 3 also shows that addition of a divalent metal halide salt had pronounced effects on film thermal properties and solubility.

Example 4

Films comprising PVOH homopolymer, additives, and calcium chloride in the amounts shown in Table 4 were prepared via solution casting. The films contained no polyol or sugar alcohol plasticizers. Amounts are shown in PHR.

TABLE 4

|  | 4a | 4b | 4c | 4d | 4e | 4f | 4g |
|---|---|---|---|---|---|---|---|
| Amounts (PHR) | | | | | | | |
| PVOH homopolymer | 100.0 | 100.0 | 100.0 | 100.0 | 100.0 | 100.0 | 100.0 |
| Polyol | 0.0 | 0.0 | 0.0 | 0.0 | 0.0 | 0.0 | 0.0 |
| Sugar alcohol | 0.0 | 0.0 | 0.0 | 0.0 | 0.0 | 0.0 | 0.0 |
| Additives | 0.8 | 0.8 | 0.7 | 0.8 | 0.8 | 0.7 | 0.7 |
| Calcium chloride | 0.0 | 2.1 | 4.0 | 8.1 | 10.1 | 16.1 | 24.1 |
| Properties | | | | | | | |
| Tensile Strength (N/mm$^2$) | 100 | 129 | 129 | 132 | 119 | 127 | 80.2 |
| Strain at Break (%) | 23 | 7 | 5 | 6 | 5 | 10 | 215 |
| Young's Modulus (N/mm$^2$) | 3096 | 3406 | 4174 | 3567 | 3808 | 4224 | 2344 |
| Tg (° C.) | — | — | — | — | — | — | — |
| Tg$_2$ (° C.) | 70 | 79 | 86 | 102 | 111 | 123 | 139 |
| Tm (° C.) | 190 | 180 | 175 | — | — | — | — |
| Enthalpy of Melting (J/g) | 10.7 | 17.8 | 9.3 | — | — | — | — |
| Tc (° C.) | 159 | 142 | — | — | — | — | — |
| Enthalpy of Crystallization | 18.9 | 17.9 | — | — | — | — | — |

TABLE 4-continued

|  | 4a | 4b | 4c | 4d | 4e | 4f | 4g |
|---|---|---|---|---|---|---|---|
| Disintegration time (s) | >300 | 143 | 88 | 57 | 56 | 44 | 30 |
| Dissolution time (s) | >300 | 221 | 149 | 109 | 95 | 76 | 57 |

In general, films of Example 4 exhibited high tensile strength, high Young's modulus, and low strain at break, consistent with the absence of plasticizers in these films. Increasing the amount of calcium chloride in the plasticizer-free films from 0 PHR to about 16 PHR had only slight effects on tensile stress and strain at break. Though the film containing no calcium chloride did not disintegrate or dissolve with the time frame of the test method, the films became more readily water-soluble with increasing calcium chloride content, as indicated by decreasing dissolution and disintegration times, up to and including 24 PHR calcium chloride loading.

At 24 PHR calcium chloride loading, there was a step change in several film properties. Tensile strength decreased by roughly 30-40% compared to tensile strengths of the films containing from 2 to 16 PHR calcium chloride, and the film containing 24 PHR calcium chloride was much less brittle than films containing from 2 to 16 PHR calcium chloride, as evidenced by an increase in strain at break from less than 10% to over 200%.

While a glass transition was not observed during the initial DSC heating pass for any of the films of Example 4, glass transitions were observed for each film during second DSC heating passes. Upon reheating, the films exhibited transitions in DSC attributable to a glass transition of the water-free or nearly water-free film sample.

Films containing 4 PHR or more calcium chloride did not exhibit a crystallization transition by DSC, consistent with results of other calcium chloride-containing example films, such as Examples 2d-2g, which did not exhibit a transition in attributable to crystallization.

Without intending to be bound by theory, it is believed that increasing the calcium chloride content of the films increased their residual water content, resulting in films that were more readily water-disintegrable and water-soluble.

Thus, Example 4 shows that effects of added metal salt on film thermal and mechanical properties can be realized for films that do not contain added plasticizer.

Example 5

Films containing PVOH homopolymer, additives, calcium chloride, and varying amounts of polyol and sugar alcohol as plasticizers, in the amounts shown in Table 5, were prepared by solution casting. Amounts are shown in PHR. Total plasticizer content (i.e., glycerin+xylitol) of each film is listed in the table in parentheses for sake of clarity and does not indicate additional plasticizer in each film. The weight ratio of polyol to sugar alcohol (P/S) in each film is also listed.

TABLE 5

|  | 5a | 5b | 5c | 5d | 5e | 5f |
|---|---|---|---|---|---|---|
| Amounts |  |  |  |  |  |  |
| PVOH homopolymer | 100.0 | 100.0 | 100.0 | 100.0 | 100.0 | 100.0 |
| Polyol | 12.1 | 18.1 | 17.9 | 24.0 | 30.0 | 36.1 |
| Sugar alcohol | 5.4 | 7.9 | 15.9 | 10.6 | 13.3 | 8.0 |
| Additives | 0.8 | 0.8 | 0.7 | 0.7 | 0.8 | 0.8 |
| Calcium chloride | 10.0 | 10.0 | 10.0 | 10.0 | 10.0 | 10.1 |
| (Total plasticizer) | (17.5) | (26.0) | (33.8) | (34.6) | (43.3) | (44.1) |
| (P/S) | (2.2) | (2.3) | (1.1) | (2.3) | (2.3) | (4.5) |
| Properties |  |  |  |  |  |  |
| Tensile Strength (N/mm$^2$) | 39.6 | 30.8 | 27.1 | 29.7 | 23.8 | 25.1 |
| Strain at Break (%) | 328 | 338 | 384 | 412 | 451 | 499 |
| Young's Modulus (N/mm$^2$) | 154 | 92.1 | 28.7 | 22.3 | 11.8 | 9.5 |
| Tg (° C.) | 29 | 7 | 9 | 7 | 2 | −3 |
| Tg$_2$ (° C.) | 72 | 56 | 50 | 48 | 40 | 38 |
| Tm (° C.) | — | 153 | 153 | — | 152 | 149 |
| Enthalpy of Melting (J/g) | — | 0.1 | 1.5 | — | 1.0 | 1.2 |
| Tc (° C.) | — | — | — | — | — | — |
| Enthalpy of Crystallization (J/g) | — | — | — | — | — | — |
| Disintegration time (s) | 42 | 31 | 34 | 29 | 29 | 26 |
| Dissolution time (s) | 91 | 56 | 77 | 58 | 58 | 55 |

In general, Examples 5a-5f indicate that expected trends in thermal and mechanical properties were not disrupted by the addition of 10 PHR calcium chloride, over a range of plasticizer levels and ratios of different plasticizers. In particular, as shown by Examples 5a, 5b, 5d, and 5e, with increasing plasticizer content, Tg and Tg$_2$ generally decreased, tensile strength and Young's modulus decreased, % strain at break increased, and disintegration and dissolution times decreased; the presence of calcium chloride in the films did not disrupt these expected trends. Furthermore, all films had very low or undetectable enthalpies of melting and crystallization, consistent with results for other films comprising 10 PHR calcium chloride as described above. Accordingly, the presence of calcium chloride in the films can provide the benefit of reduced energy barrier to melting without substantially interfering with the expected effects of added plasticizer on the films.

Thus, Example 5 shows that effects of added calcium chloride on film thermal and mechanical properties can be realized over a range of plasticizer levels and compositions.

Example 6

Films containing various PVOH resins, plasticizer, additives, and calcium chloride, in the amounts shown in Table 6, were prepared by solution casting. Amounts are shown in PHR. Table 6 includes type, viscosity, and degree of hydrolysis of each PVOH resin. For Examples 6g-6i, comprising acrylate-modified PVOH, the resins are further characterized by a degree of ring opening (RO). PVOH copolymer resins having pendant carboxyl groups, such as, for example, polyvinyl alcohol-co-acrylate polymers, can form lactone rings via reaction of neighboring pendant carboxyl and alcohol groups. For Examples 6g-6i, "0% RO" or "70% RO" indicates that 0% or roughly 70%, respectively, of the lactone rings on the resin backbone have been opened to form the corresponding pendant carboxyl and alcohol groups.

the addition of calcium chloride did not substantially affect the solubility of this film. For PVOH homopolymers and maleate-modified PVOH copolymers, expected dependence on PVOH molecular weight of other film properties, including tensile strength, Young's modulus, % strain at break, and disintegration and dissolution times, were not affected by the addition of calcium chloride.

Adding calcium chloride to a film comprising 0% ring-opened acrylate-modified PVOH copolymer had similar effects on thermal properties to those observed for adding calcium chloride to films comprising PVOH homopolymer or maleate-modified PVOH copolymer. Comparing Examples 6g and 6h, addition of 10 PHR calcium chloride resulted in reduced melting temperature and enthalpy of melting and suppression of any measurable crystallization transition. The effects of adding calcium chloride were even more pronounced for Example 6i, comprising a partially ring-opened acrylate-modified PVOH copolymer: melting and crystallization transitions were suppressed, and the film was much more readily water-soluble than an otherwise identical film comprising non-ring-opened acrylate-modified PVOH copolymer.

TABLE 6

|  | 6a | 6b | 6c | 6d | 6e | 6f | 6g | 6h | 6i |
|---|---|---|---|---|---|---|---|---|---|
|  |  |  |  |  |  |  | \multicolumn{3}{c}{Acrylate copolymer} | | |
| PVOH type | | Homopolymer | | | Maleate copolymer | | (0% RO) | (0% RO) | (70% RO) |
| Viscosity (cP) | 6 | 13 | 40 | 30 | 18 | 24 | 20 | 20 | 20 |
| DH | 88% | 88% | 88% | 100% | 90% | 91% | 100% | 100% | 100% |
| Amounts (PHR) | | | | | | | | | |
| PVOH | 100.0 | 100.0 | 100.0 | 100.0 | 100.0 | 100.0 | 100.0 | 100.0 | 100.0 |
| Polyol | 18.0 | 18.0 | 18.0 | 18.0 | 18.0 | 18.0 | 18.0 | 18.0 | 18.0 |
| Sugar alcohol | 8.0 | 8.0 | 8.0 | 8.0 | 8.0 | 8.0 | 8.0 | 8.0 | 8.0 |
| Additives | 0.8 | 0.8 | 0.8 | 0.8 | 0.8 | 0.8 | 0.8 | 0.8 | 0.8 |
| Calcium chloride | 10.0 | 10.0 | 10.0 | 15.0 | 10.0 | 10.0 | 0.0 | 10.0 | 10.0 |
| Properties | | | | | | | | | |
| Tensile Strength (N/mm$^2$) |  | 30.8 | 31.0 | 52.6 | 37.1 | 44.2 | 52.8 | 44.5 | 45.3 |
| Strain at Break (%) |  | 338 | 209 | 302 | 328 | 262 | 521 | 367 | 338 |
| Young's Modulus (N/mm$^2$) |  | 92.1 | 314 | 441 | 88.4 | 325 | 83.0 | 130 | 111 |
| Tg (° C.) |  | 7 | 21 | 18 | 12 | 21 | 5 | 5 | — |
| Tg$_2$ (° C.) |  | 56 | 59 |  | 60 | 60 | 19 | 71 | — |
| Tm (° C.) |  | 153 | — | 184 | — | 165 | 187 | 170 | — |
| Enthalpy of Melting (J/g) |  | 0.1 | — | 7.3 | — | 2.4 | 16.8 | 3.6 | — |
| Tc (° C.) |  | — | — | 130 | — | — | 160 | — | — |
| Enthalpy of Crystallization (J/g) |  | — | — | 4.9 | — | — | 28.2 | — | — |
| Disintegration time (s) |  | 31 | 41 | >30 min | 24 | 44 | >480 | 118 | 41 |
| Dissolution time (s) |  | 56 | 109 | >30 min | 56 | 118 | NA | NA | 108 |

In general, films containing 10 PHR calcium chloride had lower enthalpy of melting than that of Example 2a which did not contain calcium chloride. This effect was observed for films containing PVOH resins of varying type and molecular weight. The reduction in enthalpy of melting effect was less pronounced for Example 6d, comprising PVOH homopolymer having 100% DH (i.e., homopolymer with 100% of acetate groups in poly(vinyl acetate) converted to hydroxyl groups), and the melting temperature of this film was 10° C. higher than that of Example 2a. Example 6d also had very long disintegration and dissolution times, consistent with the expected low solubility of PVOH having 100% DH resin;

Thus, Example 6 shows that effects of adding metal salt were realized for films comprising PVOH homopolymer and films comprising maleate-modified or acrylate-modified PVOH copolymer.

Example 7

Films containing PVOH homopolymer, plasticizer, additives, and sodium or lithium chloride, in the amounts shown in Table 7, were prepared by solution casting. Amounts are shown in PHR. The amounts of each salt are roughly equimolar to 10 PHR calcium chloride (7a, 7c) and 20 PHR calcium chloride (7b, 7d).

TABLE 7

| Amounts (PHR) | 7a | 7b | 7c | 7d |
|---|---|---|---|---|
| PVOH homopolymer | 100.0 | 100.0 | 100.0 | 100.0 |
| Polyol | 18.0 | 18.0 | 18.0 | 18.0 |
| Sugar alcohol | 8.0 | 8.0 | 8.0 | 8.0 |
| Additives | 0.8 | 0.8 | 0.8 | 0.8 |
| Sodium chloride | 5.3 | 9.5 | | |
| Lithium chloride | | | 3.8 | 7.7 |
| Properties | | | | |
| Tensile Strength (N/mm$^2$) | 36.8 | 36.3 | 32.3 | 24.9 |
| Strain at Break (%) | 336 | 419 | 401 | 469 |
| Young's Modulus (N/mm$^2$) | 74.0 | 39.5 | 20.5 | 5.7 |
| Tg (° C.) | 9 | 4 | −11 | −1 |
| Tg$_2$ (° C.) | 34 | 24 | 34 | 42 |
| Tm (° C.) | 165 | 156 | 152 | — |
| Enthalpy of Melting (J/g) | 5.5 | 7.7 | 1.5 | — |
| Tc (° C.) | 118 | 102 | 76 | — |
| Enthalpy of Crystallization (J/g) | 12.0 | 12.0 | 2.6 | — |
| Disintegration time (s) | 40 | 26 | 30 | 26 |
| Dissolution time (s) | 74 | 61 | 59 | 61 |

In general, addition of lithium chloride had a more pronounced effect on melting and crystallization of the films than addition of sodium chloride. While addition of sodium chloride did reduce enthalpy of melting compared to that of a salt-free film, Example 2a, addition of lithium chloride provided a greater reduction in enthalpy of melting, as well as a significant reduction in enthalpy of crystallization. Furthermore, addition of 7.7 PHR of lithium chloride was sufficient to suppress discrete melting and crystallization transitions. Addition of lithium chloride thus provided similar effects on film thermal properties as addition of calcium chloride. With regards to mechanical properties, addition of lithium chloride had a less pronounced effect on % strain at break than addition of sodium chloride; that is, while the films containing sodium chloride or lithium chloride exhibited reduced % strain at break compared to that of the film of Example 2a, the magnitude of the reduction was less for lithium chloride. Furthermore, for both sodium chloride and lithium chloride, increasing the amount of salt (i.e., Example 7b vs. 7a, and Example 7d vs. 7c) provided a more flexible film, as indicated by the 25% and 17% increases, respectively, in % strain at break.

Thus, Example 7 shows that addition of a monovalent salt affected film thermal and mechanical properties and that addition of lithium chloride generally had a more pronounced effect on film properties than addition of sodium chloride.

Example 8: Salt Water Solubility

Films containing PVOH homopolymer, plasticizer, additives, and calcium chloride or no calcium chloride, in the amounts shown in Table 8, were prepared by solution casting. Amounts are shown in PHR. Table 8 includes disintegration and dissolution times in salt water (3.5% sodium chloride solution) for each film, as determined according to the modified MSTM 205 method described above.

TABLE 8

| Amounts (PHR) | 8a | 8b | 8c |
|---|---|---|---|
| PVOH homopolymer | 100.0 | 100.0 | 100.0 |
| Polyol | 18.0 | 18.0 | 18.0 |
| Sugar Alcohol | 8.0 | 8.0 | 8.0 |
| Additives | 0.8 | 1.4 | 0.9 |
| Calcium chloride | 0.0 | 5.8 | 16.1 |
| Properties | | | |
| Disintegration time (s) | 61 | 32 | 30 |
| Dissolution time (s) | 139 | 72 | 80 |

As shown in Table 8, films containing calcium chloride exhibited up to about 50% faster salt water solubility compared to that of a film not containing calcium chloride. Films were generally slower to dissolve in salt water compared to water (as can be seen, for instance, by comparing dissolution times in salt water and in water of films having the same compositions, namely Examples 8a and Example 2a, and Examples 8c and Example 2f), though the relative increase in solubility upon addition of calcium chloride was greater for solubility in salt water compared to solubility in water.

Example 9: Increased Conductivity

Films comprising a fully hydrolyzed PVOH homopolymer (100% DH, 30 cP) and a metal salt in an amount equimolar to 10 phr of calcium chloride were prepared by solution casting. Resistance of the films was measured with the film in a dry state (1), after the film was treated at 50° C. for 48 hr; and in a hydrated state (2), after the dry film treated according to step (1) was immersed in distilled water for 5 minutes, patted dry to remove bulk water, and treated at 23° C. and 50% RH for 3 hr. Resistances of films containing the PVOH homopolymer and calcium acetate (Ca(OAc)$_2$), magnesium chloride, or sodium chloride, and the ratio of resistance in the dry state to resistance in the hydrated state for each film, are shown in Table 9.

TABLE 9

| | 9a | 9b | 9c |
|---|---|---|---|
| PVOH: | PVOH homopolymer (100% hydrolyzed, 30 cP) | | |
| Salt: | Ca(OAc)$_2$ | MgCl$_2$ | NaCl |
| Resistance in: | | | |
| Dry state (1) | >60 MΩ | 3.5 MΩ | 40 MΩ |
| Hydrated state (2) | 1230 Ω | 640 Ω | 5200 Ω |
| Resistance ratio (dry state / hydrated state) | ~49,000 | ~5,500 | ~7,700 |

The films comprising a metal salt underwent a substantial drop in resistance, ranging from three to five orders of magnitude, upon conversion from a dry state to a hydrated state. Without intending to be bound by theory, it is believed that ions in the metal salt-containing films facilitate transfer of charge through the hydrated films, and that the dry films contain insufficient water for the ions in the film to conduct charge, rendering the dried films effectively non-conductive.

Example 10: Conductivity

Films comprising a PVOH homopolymer (88% DH, 13 cP) and salt in an amount equimolar to 10 PHR of calcium chloride, and a film comprising the same PVOH homopolymer and no salt, were prepared by solution casting. Films for which two salts are listed contain an equimolar amount of each salt. Resistance of each film was measured with the film initially in a dry state, i.e., after being conditioned for at least 24 hr at 23° C./35% RH. Films were then transferred to a 23° C./50% RH environment or a 38° C./80% RH environment, and resistance was measured after 30 min, 60 min, 120 min, and 24 hr in each environment. Results are shown in Table 10; measured resistance values are shown in megaohms (MΩ). ">" indicates that the resistance was too high to be measured on a digital multimeter, i.e., greater than about 62 MΩ.

TABLE 10

| | | | 23° C./50% RH | | | | 38° C./80% RH | | | |
|---|---|---|---|---|---|---|---|---|---|---|
| Sample | | Dry | 30 min | 60 min | 120 min | 24 hr | 30 min | 60 min | 120 min | 24 hr |
| 10a | No salt | > | > | > | > | > | > | 34 | 27 | 19 |
| 10b | $CaCl_2$ | > | > | > | > | 21 | 23 | 7 | 4 | 3 |
| 10c | $MgCl_2$ | > | 50 | 34 | 26 | 15 | 8 | 5 | 2 | 2 |
| 10d | $Ca(OAc)_2$ | > | > | > | > | > | 22 | 17 | 12 | 11 |
| 10e | $Mn(OAc)_2$ | > | > | > | > | > | 30 | 26 | 15 | 10 |
| 10f | NaCl | > | 28 | 21 | 17 | 15 | 9 | 7 | 4 | 2 |
| 10g | LiCl | > | 40 | 25 | 23 | 20 | 10 | 10 | 7 | 3 |
| 10h | $CaCl_2$/LiCl | > | 35 | 33 | 31 | 24 | 9 | 8 | 4 | 2 |
| 10i | $CaCl_2$/$Ca(OAc)_2$ | > | > | > | > | 37 | 18 | 18 | 10 | 16 |
| 10j | $MgSO_4$ | > | > | > | > | > | > | > | 39 | 29 |
| 10k | Guanidinium chloride | 49 | 20 | 18 | 21 | 13 | 14 | 8 | 7 | 8 |
| 10l | KCl | 52 | 34 | 28 | 29 | 16 | 13 | 9 | 3 | 3 |
| 10m | KI | 31 | 15 | 12 | 11 | 6 | 5 | 4 | 3 | 5 |
| 10n | $Mg(OAc)_2$ | > | > | > | > | > | > | 24 | 18 | 22 |
| 10o | $CaSO_4$ | > | > | > | > | > | > | 42 | 33 | 37 |
| 10p | NaOAc | > | > | 46 | 40 | 35 | 34 | 26 | 19 | 18 |
| 10q | $Mg(OAc)_2$ | > | > | > | > | > | 43 | 22 | 18 | 12 |
| 10r | $NH_4Cl$ | 24 | 12 | 9 | 7 | 3 | 8 | 2 | 2 | 1 |

Table 10 indicates, for films and conditions for which resistance was measurable, that resistance decreased during conditioning in 50% and 80% RH environments and that resistance was generally lower upon storage at 80% RH relative to storage at 50% RH. In most cases, the films containing added salt exhibited lower resistance compared to a film not containing added salt following conditioning at identical time, temperature, and humidity conditions. In general, addition of chloride salts had a greater effect on reducing resistance compared to addition of salts of other anions. Addition of ammonium chloride, in particular, resulted in reduced resistance (i.e., higher conductivity) relative to addition of the same molar amount of other salts.

Example 11

Films comprising a PVOH homopolymer (88% DH, 13 cP), plasticizer, additives, and a zinc salt (zinc chloride or zinc acetate; Examples 11a and 11b, respectively) or no added salt (Example 2a), in the amounts shown in Table 11, were prepared by solution casting. Amounts are shown in PHR. Disintegration and dissolution times were measured in 10° C. water. Data for Example 2a, a film containing no added salt, are included in the table for ease of comparison.

TABLE 11

| Amounts (PHR) | 2a | 11a | 11b |
|---|---|---|---|
| PVOH homopolymer | 100.0 | 100.0 | 100.0 |
| Polyol | 18.0 | 18.0 | 18.0 |
| Sugar Alcohol | 8.0 | 8.0 | 8.0 |
| Additives | 0.8 | 0.8 | 0.8 |
| Zinc chloride | — | 5.0 | — |

TABLE 11-continued

| Amounts (PHR) | 2a | 11a | 11b |
|---|---|---|---|
| Zinc acetate | — | — | 10.0 |
| Properties | | | |
| Tensile Strength ($N/mm^2$) | 32.9 | 37.8 | 38.6 |
| Strain at Break (%) | 524 | 401 | 372 |

TABLE 11-continued

| Amounts (PHR) | 2a | 11a | 11b |
|---|---|---|---|
| Young's Modulus ($N/mm^2$) | 46.6 | 77.5 | 68.3 |
| Tg (° C.) | −11 | −4 | −4 |
| $Tg_2$ (° C.) | 21 | 22 | 35 |
| Tm (° C.) | 174 | 176 | 169 |
| Enthalpy of Melting (J/g) | 11.5 | 5.7 | 11.8 |
| Tc (° C.) | 121 | 152 | 89 |
| Enthalpy of Crystallization (J/g) | 10.9 | 19.5 | 5.5 |
| Disintegration time (s) (at 10° C.) | 32 | 38 | 34 |
| Dissolution time (s) (at 10° C.) | 72 | 65 | 69 |

In general, addition of zinc chloride or zinc acetate had less pronounced effects on thermal properties of the films compared to addition of other multivalent salts. For example, addition of zinc salts had less pronounced effects on Tg and $Tg_2$ compared to addition of calcium, magnesium, or manganese salts. Addition of 5.0 PHR of zinc chloride or 10.0 PHR of zinc acetate to the film of Example 2a resulted in a 7° C. increase in Tg and up to a 14° C. increase in $Tg_2$, while addition of 10.0 PHR of calcium chloride to the film of Example 2a (Example 2e) resulted in increases in Tg and $Tg_2$ of 18° C. and 35° C., respectively. Addition of magnesium chloride or manganese acetate in amounts equimolar to 10.0 PHR of calcium chloride (Examples 3a and 3c, respectively) also resulted in greater increases in Tg (35° C., 42° C.) and $Tg_2$ (45° C., 18° C.) than the increases resulting from addition of 10.0 PHR of zinc acetate. Addition of zinc salts also had minimal effects on reducing melting temperature.

Addition of 10.0 PHR of zinc acetate resulted in a 5° C. reduction in melting temperature compared to that of the film of Example 2a, while the film of Example 2e (10.0 PHR of calcium chloride) exhibited a 21° C. reduction in melting temperature, and the addition of magnesium chloride in an amount equimolar to 10.0 PHR of calcium chloride (Example 3a) completely suppressed the melting transition.

Example 12

Films comprising a PVOH homopolymer (88% DH, 13 cP), plasticizer, additives, and magnesium chloride, in the amounts shown in Table 12, were prepared by solution casting. Amounts are shown in PHR. Disintegration and dissolution times were measured in 10° C. water. Data for Example 2a, a film containing no added salt, are included in the table for ease of comparison.

TABLE 12

| Amounts (PHR) | 2a | 12a | 12b | 12c |
|---|---|---|---|---|
| PVOH homopolymer | 100.0 | 100.0 | 100.0 | 100.0 |
| Polyol | 18.0 | 18.0 | 18.0 | 18.0 |
| Sugar Alcohol | 8.0 | 8.0 | 8.0 | 8.0 |
| Additives | 0.8 | 1.5 | 1.5 | 1.5 |
| Magnesium chloride | 0.0 | 3.0 | 6.0 | 9.0 |
| Properties | | | | |
| Tensile Strength (N/mm$^2$) | 32.9 | 41.0 | 36.1 | 31.4 |
| Strain at Break (%) | 524 | 384 | 352 | 357 |
| Young's Modulus (N/mm$^2$) | 46.6 | 36.1 | 32.7 | 22.4 |
| Tg (° C.) | −11 | −12 | −13 | −18 |
| Tg$_2$ (° C.) | 21 | 41 | 54 | 64 |
| Tm (° C.) | 174 | 158 | — | — |
| Enthalpy of Melting (J/g) | 11.5 | 0.4 | — | — |
| Tm2 (° C.) | 163 | 151 | — | — |
| Enthalpy of Melting 2 (J/g) | 5.0 | 1.9 | — | — |
| Tc (° C.) | 121 | — | — | — |
| Enthalpy of Crystallization (J/g) | 10.9 | — | — | — |
| Disintegration time (s) (at 10° C.) | 32 | 25 | 21 | 18 |
| Dissolution time (s) (at 10° C.) | 72 | 55 | 54 | 48 |

The addition of magnesium chloride had significant effects on thermal properties of the films compared to the film containing no added metal salt. Addition of 3 PHR magnesium chloride reduced the film's melting temperature by 16° C. and reduced the enthalpy of the melting transition to nearly zero, and the film containing 3 PHR magnesium chloride did not exhibit a measurable crystallization transition. Addition of 6 PHR or 9 PHR magnesium chloride suppressed any melting transition. The addition of 3 PHR magnesium chloride also sped up dissolution compared to the film not containing no added metal salt, with slight reductions in disintegration or dissolution time upon further addition of magnesium chloride.

In general, addition of magnesium chloride had greater effects on thermal properties compared to addition of calcium chloride. For example, addition of 3 PHR of magnesium chloride had similar effects on melting and crystallization properties compared to addition of 8 PHR of calcium chloride (Example 2d), including similar reduction in Tm; a substantial reduction of the enthalpy of melting; and suppression of a measurable crystallization transition, which was not observed upon addition of smaller amounts (2 PHR, 4 PHR) of calcium chloride.

Because modifications and changes varied to fit particular operating requirements and environments will be apparent to those skilled in the art, the disclosure is not considered limited to the examples chosen for purposes of illustration, and covers all changes and modifications which do not constitute departures from the true spirit and scope of this disclosure.

Accordingly, the foregoing description is given for clearness of understanding only, and no unnecessary limitations should be understood therefrom, as modifications within the scope of the disclosure may be apparent to those having ordinary skill in the art.

Throughout the specification, where the compounds, compositions, articles, methods, and processes are described as including components, steps, or materials, it is contemplated that the compositions, processes, or apparatus can also comprise, consist essentially of, or consist of, any combination of the recited components or materials, unless described otherwise.

What is claimed is:

1. A water-soluble film, comprising:
a mixture of a polyvinyl alcohol (PVOH) resin, a plasticizer, and a multivalent metal salt, wherein the multivalent metal salt is present in the water-soluble film in an amount sufficient to reduce the enthalpy of melting of the film by at least 20% compared to the enthalpy of melting of an otherwise identical film not comprising the multivalent metal salt,
wherein the PVOH resin is present in the film in an amount of at least 50 wt. %, based on the total weight of the film, and
wherein the multivalent metal salt comprises an inorganic anion.

2. The water-soluble film of claim 1, wherein the multivalent metal salt is selected from calcium salts, magnesium salts, manganese salts, barium salts, iron salts, and mixtures thereof.

3. The water-soluble film of claim 1, wherein the inorganic anion is selected from a halide, a nitrate, a sulfate, a phosphate, and a combination thereof.

4. The water-soluble film of claim 1, wherein the film comprises calcium chloride or magnesium chloride.

5. The water-soluble film of claim 1, wherein the film does not comprise a zinc salt.

6. The water-soluble film of claim 1, wherein the multivalent metal salt is present in the water-soluble film in an amount in a range from about 1 part to about 30 parts per 100 parts PVOH resin (PHR).

7. The water-soluble film of claim 1, wherein the plasticizer is selected from the group of a polyol, a sugar alcohol, a polyether, an amine, and mixtures thereof.

8. The water-soluble film of claim 1, wherein the plasticizer does not include a divalent metal.

9. The water-soluble film of claim 1, wherein the PVOH resin comprises one or more PVOH homopolymers, one or more PVOH copolymers, or a mixture thereof.

10. The water-soluble film of claim 1, wherein the film comprises one or more additives selected from fillers, surfactants, anti-block agents, antioxidants, antifoams, bleaching agents, aversive agents, pungents, other functional ingredients, and combinations of the foregoing.

11. The water-soluble film of claim 1, wherein the film is characterized by having an enthalpy of crystallization of less than about 30 J/g, or less than about 20 J/g, or less than about 15 J/g, or less than about 10 J/g, or less than about 1 J/g, as determined by DSC.

12. The water-soluble film of claim 1, wherein the film is characterized by having a tensile strength in a range of from about 20 to about 200 N/mm$^2$, or from about 25 to about 100 N/mm$^2$, or from about 30 to about 50 N/mm$^2$, as measured according to the Tensile Strength Test.

13. The water-soluble film of claim 1, wherein the film is characterized by having a strain at break in a range of from about 250% to about 500%, or from about 300% to about 450%, or from about 350% to about 400%, as measured according to the Elongation at Break Test.

14. The water-soluble film of claim 1, wherein the film is characterized by having a Young's modulus in a range of from about 40 to about 1000 N/mm$^2$, or about 50 to about 500 N/mm$^2$, or about 60 to about 300 N/mm$^2$, or about 100 to about 200 N/mm$^2$, as measured according to the Tensile Strength Test.

15. The water-soluble film of claim 1, wherein the film, when provided at a thickness of about 76 microns, has a disintegration time that is at least 30% less than, or at least 40% less than, or at least 45% less than, or at least 50% less than, the disintegration time of an otherwise identical film not containing the multivalent salt, wherein the disintegration times are measured according to MonoSol Test Method MSTM 205 at 5° C. in aqueous solutions of 3.5 wt. % sodium chloride.

16. The water-soluble film of claim 1, wherein the film, when provided at a thickness of about 76 microns, has a dissolution time that is at least 30% less than, or at least 40% less than, or at least 45% less than, or at least 50% less than, the dissolution time of an otherwise identical film not containing the multivalent salt, wherein the dissolution times are measured according to MonoSol Test Method MSTM 205 at 5° C. in aqueous solutions of 3.5 wt. % sodium chloride.

17. The water-soluble film of claim 1, wherein the film is characterized by a crystallization temperature that is at least 5° C. less than, or at least 10° C. less than, or at least 20° C. less than, or at least 30° C. less than, or at least 40° C. less than, the crystallization temperature of an otherwise identical film not comprising the multivalent metal salt.

18. The water-soluble film of claim 1, wherein the film is characterized by a glass transition temperature that is at least 10° C. greater than, or at least 15° C. greater than, or at least 20° C. greater than, the glass transition temperature of an otherwise identical film not comprising the multivalent metal salt.

19. The water-soluble film of claim 1, further comprising a multivalent metal salt having an organic anion.

20. The water-soluble film of claim 1, wherein the film further comprises ammonium chloride.

21. A water-soluble unit dose article comprising at least one compartment and optionally a composition housed in the compartment, wherein the compartment comprises at least one wall and at least one wall of the compartment comprises the water-soluble film of claim 1.

22. A method of forming a water-soluble article, comprising thermoforming the water-soluble film of claim 1 at a temperature no greater than 90° C., or no greater than 80° C., or no greater than 70° C., or no greater than 60° C., or no greater than 40° C., or no greater than 25° C.

23. A water-soluble film comprising a mixture of a polyvinyl alcohol (PVOH) resin, a plasticizer, and a lithium salt.

24. A water-soluble film, comprising:
a mixture of a polyvinyl alcohol (PVOH) resin, a plasticizer, and a salt, wherein the film has a resistance in a dry state of less than about 60 MΩ (megaohms), or less than about 50 MΩ, or less than about 40 MΩ, or less than about 30 MΩ, as measured according to the Resistance Test Method.

25. A water-soluble fiber, comprising:
a mixture of a polyvinyl alcohol resin, a plasticizer, and a multivalent metal salt, wherein the multivalent metal salt is present in the water-soluble fiber in an amount sufficient to reduce the enthalpy of melting of the film by at least 20% compared to the enthalpy of melting of an otherwise identical fiber not comprising the multivalent metal salt,
wherein the polyvinyl alcohol resin is present in the fiber in an amount of at least 50 wt. %, based on the total weight of the film, and
wherein the multivalent metal salt comprises an inorganic anion.

* * * * *